US007796125B2

(12) United States Patent
Morita

(10) Patent No.: US 7,796,125 B2
(45) Date of Patent: Sep. 14, 2010

(54) VOLTAGE SUPPLY CIRCUIT, POWER SUPPLY CIRCUIT, DISPLAY DRIVER, ELECTRO-OPTIC DEVICE, AND ELECTRONIC APPARATUS

(75) Inventor: Akira Morita, Suwa (JP)

(73) Assignee: Seiko Epson Corporation (JP)

( * ) Notice: Subject to any disclaimer, the term of this patent is extended or adjusted under 35 U.S.C. 154(b) by 1025 days.

(21) Appl. No.: 11/235,635

(22) Filed: Sep. 26, 2005

(65) Prior Publication Data

US 2006/0066552 A1 Mar. 30, 2006

(30) Foreign Application Priority Data

Sep. 27, 2004 (JP) ............................ 2004-279503

(51) Int. Cl.
*G06F 3/038* (2006.01)

(52) U.S. Cl. ...................................... 345/211; 345/212

(58) Field of Classification Search .................. 345/52, 345/54, 209–213, 74, 208, 87–104; 327/407–408; 363/59–60

See application file for complete search history.

(56) References Cited

U.S. PATENT DOCUMENTS 6,222,516 B1 * 4/2001 Oda et al. ..................... 345/94
6,492,970 B1 * 12/2002 Furuhashi et al. ............. 345/94
2001/0030645 A1 * 10/2001 Tsutsui et al. ............... 345/211
2002/0063669 A1 * 5/2002 Yanagi et al. ................. 345/87
2002/0145599 A1 * 10/2002 Endo et al. .................. 345/211
2003/0201959 A1 * 10/2003 Sakaguchi ................... 345/87
2004/0041773 A1 * 3/2004 Takeda et al. ................. 345/98
2005/0057231 A1 * 3/2005 Morita ....................... 323/268

FOREIGN PATENT DOCUMENTS

JP 09-149629 6/1997
JP 2001-100177 4/2001
JP 2002-366114 12/2002

* cited by examiner

*Primary Examiner*—Amr Awad
*Assistant Examiner*—Aaron Midkiff
(74) *Attorney, Agent, or Firm*—Harness, Dickey & Pierce, P.L.C.

(57) ABSTRACT

A voltage supply circuit which switches a first voltage supplied to an electrode to a second voltage and supplies the second voltage to the electrode including: a first voltage boost circuit including a switching element for generating a boosted voltage boosted by charge-pump operation; and a charge supply circuit for supplying a charge to the electrode. When the first voltage is switched to the second voltage, the charge supply circuit supplies a charge to the electrode so as to maintain the voltage of the electrode at the second voltage after the boosted voltage has been supplied to the electrode.

16 Claims, 15 Drawing Sheets

VOLTAGE SUPPLY CIRCUIT, POWER SUPPLY CIRCUIT, DISPLAY DRIVER, ELECTRO-OPTIC DEVICE, AND ELECTRONIC APPARATUS

Japanese Patent Application No. 2004-279503, filed on Sep. 27, 2004, is hereby incorporated by reference in its entirety.

BACKGROUND OF THE INVENTION

The present invention relates to a voltage supply circuit, a power supply circuit, a display driver, an electro-optic device and an electronic apparatus.

An active-matrix liquid crystal display includes a plurality of scanning lines and a plurality of data lines arranged in a matrix. The display also includes a plurality of switching elements each of which is coupled to a scanning line and a data line, and a plurality of pixel electrodes each of which is coupled to a switching element. Each pixel electrode is placed face to face with an opposing electrode with a liquid crystal (electro-optic material in a broad sense) therebetween.

With the liquid crystal display of this configuration, voltage supplied to a data line via a switching element that has been turned on by a selected scanning line is applied to a pixel electrode. Depending on this voltage applied between the pixel electrode and a corresponding opposing electrode, the transmission of the pixel varies.

Liquid crystals in liquid crystal displays have to be driven in an alternate manner so as to prevent deterioration of the liquid crystals. Therefore, liquid crystal displays provide polarity inversion driving that inverts the polarity of the voltage between a pixel electrode and an opposing electrode every frame or plural horizontal scanning periods. The polarity inversion driving can be provided by changing the voltage supplied to the opposing electrode in sync with polarity inversion timing, for example.

To provide this polarity inversion driving, voltage boosted by charge-pump operation is directly supplied to the opposing electrode, for example. Alternatively, voltage boosted by charge-pump operation is used as a power supply voltage of a voltage regulation circuit in order to supply an output from the voltage regulation circuit to the opposing electrode, for example. JP-A-2001-100177 and JP-A-2002-366114 are examples of related art.

The charge-pump operation involves little power loss with high efficiency, but requires a capacitance element to stabilize boosted voltage. Furthermore, supplying a voltage boosted by this charge-pump operation directly to the opposing electrode degrades picture quality because of a voltage decline caused by a leak between the opposing and pixel electrodes. To avoid this degradation, a large-capacity capacitance element and a low-leak liquid crystal panel are required, which will in turn increase costs.

Meanwhile, supplying an output from the voltage regulation circuit to the opposing electrode as mentioned above can stabilize the voltage of the opposing electrode with high accuracy, while that requires to make the power supply voltage of the voltage regulation circuit about one volt higher than the output voltage of the voltage regulation circuit. It is thus necessary to drive the opposing electrode from lower-potential voltage to higher-potential voltage, or higher-potential voltage to lower-potential voltage whenever voltage applied to the opposing electrode is switched by the polarity inversion driving. As a result, a large amount of power is consumed.

SUMMARY

According to a first aspect of the invention, there is provided a voltage supply circuit which switches a first voltage supplied to an electrode to a second voltage, and supplies the second voltage to the electrode, the voltage supply circuit comprising:

a first voltage boost circuit including a switching element for generating a boosted voltage boosted by charge-pump operation; and a charge supply circuit for supplying a charge to the electrode, wherein, when the first voltage is switched to the second voltage, the charge supply circuit supplies a charge to the electrode so as to maintain the voltage of the electrode at the second voltage after the boosted voltage has been supplied to the electrode.

According to a second aspect of the invention, there is provided a power supply circuit which supplies a voltage to an opposing electrode placed face to face with a pixel electrode of an electro-optic device with an electro-optic material interposed, the power supply circuit comprising:

a higher-potential-opposing-electrode voltage generating circuit for generating a higher-potential voltage to be supplied to the opposing electrode;

a lower-potential-opposing-electrode voltage generating circuit for generating a lower-potential voltage to be supplied to the opposing electrode; and a selection circuit for selecting and outputting one of the higher-potential voltage and the lower-potential voltage to the opposing electrode in synchronization with polarity inversion timing, at least one of the higher-potential-opposing-electrode voltage generating circuit and the lower-potential-opposing-electrode voltage generating circuit including the above-described voltage supply circuit, and the power supply circuit supplying a charge to the opposing electrode so as to maintain a voltage of the opposing electrode at one of the higher-potential voltage and the lower-potential voltage, after a boosted voltage has been supplied to the opposing electrode, in synchronization with the polarity inversion timing.

According to a third aspect of the invention, there is provided a display driver which drives an electro-optic device including a pixel electrode defined by a scanning line and a data line of the electro-optic device, and an opposing electrode placed face to face with the pixel electrode with an electro-optic material interposed, the display driver comprising:

the above-described voltage supply circuit for supplying a voltage to the opposing electrode; and a driving circuit for driving the electro-optic device.

According to a fourth aspect of the invention, there is provided a display driver which drives an electro-optic device including a pixel electrode defined by a scanning line and a data line, and an opposing electrode placed face to face with the pixel electrode with an electro-optic material interposed, the display driver comprising:

the above-described power supply circuit for supplying a voltage to the opposing electrode; and a driving circuit for driving the electro-optic device.

According to a fifth aspect of the invention, there is provided an electro-optic device, comprising:

a plurality of scanning lines;

a plurality of data lines;

a pixel electrode defined by one of the scanning lines and one of the data lines;

an opposing electrode placed face to face with the pixel electrode with an electro-optic material interposed;

a scanning driver for scanning the scanning lines;

a data driver for driving the data lines; and the above-described voltage supply circuit for supplying a voltage to the opposing electrode.

According to a sixth aspect of the invention, there is provided an electro-optic device, comprising a plurality of scanning lines;

a plurality of data lines;

a pixel electrode defined by one of the scanning lines and one of the data lines;

an opposing electrode placed face to face with the pixel electrode with an electro-optic material interposed;

a scanning driver for scanning the scanning lines;

a data driver for driving the data lines; and the above-described power supply circuit for supplying a voltage to the opposing electrode.

According to a seventh aspect of the invention, there is provided an electronic apparatus, comprising:

the above-described voltage supply circuit.

According to an eighth aspect of the invention, there is provided an electronic apparatus, comprising:

the above-described power supply device.

According to a ninth aspect of the invention, there is provided an electronic apparatus, comprising:

any one of the above-described display drivers.

According to a tenth aspect of the invention, there is provided an electronic apparatus, comprising:

any one of the above-described electro-optic devices.

DETAILED DESCRIPTION OF THE EMBODIMENTS

Figure 1:
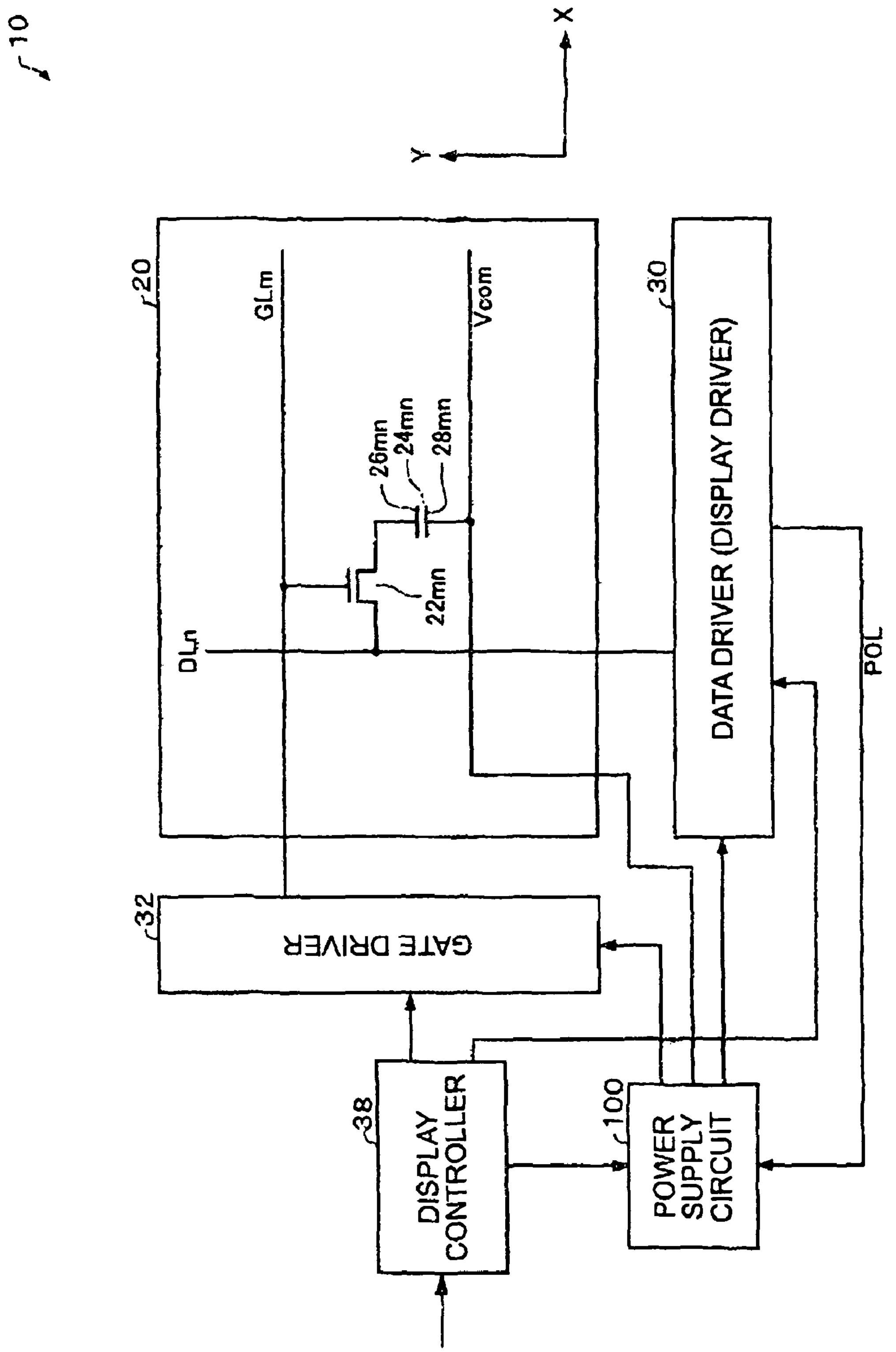
FIG. 1 schematically shows a configuration of a liquid crystal display according to one embodiment of the invention.

An advantage of the invention is to provide a power supply circuit, an opposing-electrode voltage supply circuit, a display driver, an electro-optic device and an electronic apparatus that can supply voltage to an electrode with high accuracy and low power consumption.

According to one embodiment of the invention, there is provided a voltage supply circuit which switches a first voltage supplied to an electrode to a second voltage, and supplies the second voltage to the electrode, the voltage supply circuit comprising: a first voltage boost circuit including a switching element for generating a boosted voltage boosted by charge-pump operation, and a charge supply circuit for supplying a charge to the electrode. When the first voltage is switched to the second voltage, the charge supply circuit supplies a charge to the electrode so as to maintain the voltage of the electrode at the second voltage after the boosted voltage has been supplied to the electrode.

Accordingly, the charge supply circuit may supply charges to the electrode after the voltage to be supplied to the electrode is switched to the second voltage. Therefore, it is possible to prevent a voltage decrease of the electrode due to a leak and thus to prevent picture quality from degrading, compared to a case for supplying a voltage boosted by charge-pump operation directly to the electrode. As a result, there is no need to have a large-capacity capacitance element and a low-leak electrode, and thereby involving no cost increase.

Furthermore, an output from the first voltage boost circuit is used for switching the voltage to be supplied to the electrode from the first voltage to the second voltage. Consequently, it is possible to reduce power consumption required for supplying charges by the charge supply circuit in switching from the first voltage to the second voltage. Accordingly, after a predetermined period of time following the switch from the first voltage to the second voltage, the charge supply circuit may supply the second voltage as a highly accurate voltage level. Furthermore, since the charge supply circuit does not have to switch the voltage from the first voltage to the second voltage swiftly, it is possible to reduce a charge supplying capacity of the charge supply circuit. Therefore, even assuming that the charge supply circuit supplies charges, its power consumption can be lowered. Moreover, its circuit scale can be reduced as there is no need for increasing its transistor capacity.

In this voltage supply circuit, the charge supply circuit may include an operational amplifier. The operational amplifier may have a first input terminal to which a reference voltage is supplied, and a second input terminal to which a voltage obtained by dividing a voltage between an output voltage of the operational amplifier and one power supply voltage of the operational amplifier.

In this voltage supply circuit, one power supply voltage of the operational amplifier may be generated by the first voltage boost circuit.

Accordingly, since the first voltage boost circuit may be shared, it is possible to reduce a circuit scale of the voltage supply circuit.

This voltage supply circuit may also include a second voltage boost circuit having a switching element for generating a voltage boosted by charge-pump operation as a power supply voltage of the operational amplifier.

In this voltage supply circuit, the electrode may be an opposing electrode placed face to face with a pixel electrode of an electro-optic device with an electro-optic material interposed. The first voltage may be one of a higher-potential voltage and a lower-potential voltage to be supplied to the opposing electrode, while the second voltage may be the other of the higher-potential voltage and the lower-potential voltage, and the first voltage may be switched to the second voltage in synchronization with polarity inversion timing of a voltage applied between the pixel electrode and the opposing electrode, and supplied to the opposing electrode.

Accordingly, it is possible to largely reduce power consumption required for the switch of the voltage of the opposing electrode from the lower-potential voltage to the higher-potential voltage (or from the higher-potential voltage to the lower-potential voltage) by polarity inversion driving. Therefore, the opposing electrode may be driven with a small driving capacity.

In this voltage supply circuit, the first voltage boost circuit may supply the boosted voltage to the opposing electrode and the charge supply circuit may stop supplying a charge in a first period started based on a change point of the polarity inversion timing, and the charge supply circuit may start to supply a charge to the electrode in a second period following the first period.

Accordingly, it is possible to reduce power consumption required by the charge supply circuit during the first period, and thereby further reducing power consumption.

This voltage supply circuit may also include a period setting register for setting the first period, and a period corresponding to a set value of the period setting register may be set as the first period.

Accordingly, it is easily possible to prevent picture quality from degrading and reduce power consumption, since the first period may be set according to types, etc., of an electro-optic device.

According to one embodiment of the invention, there is provided a power supply circuit which supplies a voltage to an opposing electrode placed face to face with a pixel electrode of an electro-optic device with an electro-optic material interposed, the power supply circuit comprising: a higher-potential-opposing-electrode voltage generating circuit for generating a higher-potential voltage to be supplied to the opposing electrode; a lower-potential-opposing-electrode voltage generating circuit for generating a lower-potential voltage to be supplied to the opposing electrode; and a selection circuit for selecting and outputting one of the higher-potential voltage and the lower-potential voltage to the opposing electrode in synchronization with polarity inversion timing. At least one of the higher-potential-opposing-electrode voltage generating circuit and the lower-potential-opposing-electrode voltage generating circuit includes the above-described voltage supply circuit. The power supply circuit supplies a charge to the opposing electrode so as to maintain a voltage of the opposing electrode at one of the higher-potential voltage and the lower-potential voltage, after a boosted voltage has been supplied to the opposing electrode, in synchronization with the polarity inversion timing.

Accordingly, it is possible to largely reduce power consumption required for the switch of the voltage of the opposing electrode from the lower-potential voltage to the higher-potential voltage (or from the higher-potential voltage to the lower-potential voltage) by polarity inversion driving. Therefore, the opposing electrode may be driven with a small driving capacity.

According to one embodiment of the invention, there is provided a display driver which drives an electro-optic device including a pixel electrode defined by a scanning line and a data line of the electro-optic device, and an opposing electrode placed face to face with the pixel electrode with an electro-optic material interposed, the display driver comprising: the above-described voltage supply circuit for supplying a voltage to the opposing electrode; and a driving circuit for driving the electro-optic device.

According to one embodiment of the invention, there is provided a display driver which drives an electro-optic device including a pixel electrode defined by a scanning line and a data line, and an opposing electrode placed face to face with the pixel electrode with an electro-optic material interposed, the display driver comprising: the above-described power supply circuit for supplying a voltage to the opposing electrode, and a driving circuit for driving the electro-optic device.

According to one embodiment of the invention, an electro-optic device includes a plurality of scanning lines, a plurality of data lines, a pixel electrode defined by one of the scanning lines and one of the data lines, an opposing electrode placed face to face with the pixel electrode with an electro-optic material interposed, a scanning driver for scanning the scanning lines, a data driver for driving the data lines, and the above-described voltage supply circuit for supplying a voltage to the opposing electrode.

Accordingly, it is possible to provide a display driver that is capable of supplying a highly accurate voltage to the opposing electrode while consuming less power.

According to one embodiment of the invention, an electro-optic device includes a plurality of scanning lines, a plurality of data lines, a pixel electrode defined by one of the scanning lines and one of the data lines, an opposing electrode placed face to face with the pixel electrode with an electro-optic material interposed, a scanning driver for scanning the scanning lines, a data driver for driving the data lines, and the above described power supply circuit for supplying a voltage to the opposing electrode.

Accordingly, it is possible to provide an electro-optic device that is capable of supplying a highly accurate voltage to the opposing electrode while consuming less power.

According to one embodiment of the invention, an electronic apparatus includes the above-described voltage supply circuit.

According to one embodiment of the invention, an electronic apparatus includes the above-described power supply circuit.

According to one embodiment of the invention, an electronic apparatus includes any one of the above-described display drivers.

According to one embodiment of the invention, an electronic apparatus includes any one of the above-described electro-optic devices.

Accordingly, it is possible to provide an electronic apparatus that is capable of preventing picture quality from degrading and reducing power consumption.

These embodiments of the invention will now be described with reference to the accompanying drawings. Note that the embodiments described below do not in any way limit the scope of the invention laid out in the claims herein. In addition, not all of the elements of the embodiments described below should be taken as essential requirements of the invention.

While a voltage supply circuit supplies a voltage to an opposing electrode included in an electro-optic device in the embodiments below, the invention is not limited to this. The invention is applicable to various cases for supplying a voltage to an electrode.

1. Liquid Crystal Display

FIG. 1 schematically shows a configuration of an active-matrix liquid crystal display according to one embodiment of the invention.

This liquid crystal display 10 includes a liquid crystal display panel (a display panel in a broad sense, and an electro-optic device in a broader sense) 20. The liquid crystal display panel 20 is provided on a glass substrate, for example. On this glass substrate, the following lines are arranged: a plurality of scanning lines (gate lines) GL1 to GLM (M is an integer that is 2 or more) arranged in the Y direction and extending in the X direction; and a plurality of data lines (source lines) DL1 to DLN (N is an integer that is 2 or more) arranged in the X direction and extending in the Y direction. A pixel area (pixel) is provided corresponding to an intersection of a scanning line GLm ($1 \leqq m \leqq M$, m is an integer) and a data line DLn ($1 \leqq n \leqq N$, n is an integer). Provided in this pixel area is a thin film transistor (TFT) 22*mn*.

The gate of the TFT 22*mn* is coupled to the scanning line GLm. The source of the TFT 22*mn* is coupled to the data line DLn. The drain of the TFT 22*mn* is coupled to a pixel electrode 26*mn*. A space between the pixel electrode 26*mn* and an opposing electrode 28*mn* placed face to face with the pixel electrode is filled with a liquid crystal (an electro-optic material in a broad sense) to provide a liquid crystal capacitance (a liquid crystal element in a broad sense) 24*mn*. The transmission of the pixel varies depending on the voltage applied between the pixel electrode 26*mn* and the opposing electrode 28*mn*. To the opposing electrode 28*mn*, opposing electrode voltage Vcom is supplied.

This liquid crystal display panel 20 is formed by bonding a first substrate having the pixel electrode and TFT, for example and a second substrate having the opposing electrode together, and filling a liquid crystal as an electro-optic material in between the two substrates.

The liquid crystal display 10 includes a data driver (a display driver in a broad sense) 30. The data driver 30 drives the data lines DL1 to DLN included in the liquid crystal display panel 20 based on display data.

The liquid crystal display 10 may also include a gate driver (a display driver in a broad sense) 32. The gate driver 32 sequentially drives (scans) the scanning lines GL1 to GLM included in the liquid crystal display panel 20 in a vertical scanning period.

The liquid crystal display 10 also includes a power supply circuit 100. The power supply circuit 100 generates the voltage required to drive the data lines and supplies the voltage to the data driver 30. For example, the power supply circuit 100 generates power supply voltages VDDH and VSS required to drive the data lines included in the data driver 30 and the voltage of a logic part in the data driver 30. The power supply circuit 100 also generates the voltage required to scan the scanning lines and supplies the voltage to the gate driver 32.

Furthermore, the power supply circuit 100 includes an opposing-electrode voltage supply circuit that generates opposing-electrode voltage Vcom. In other words, the power supply circuit 100 (opposing-electrode voltage supply circuit) outputs the opposing-electrode voltage Vcom that periodically repeats higher-potential voltage VCOMH and lower-potential voltage VCOML in line with the timing of a polarity inversion signal POL generated by the data driver 30 to the opposing electrode included in the liquid crystal display panel 20.

The liquid crystal display 10 may also include a display controller 38. The display controller 38 controls the data driver 30, the gate driver 32, and the power supply circuit 100 in accordance with what has been set by a host (not shown), such as a central processing unit (CPU). For example, the display controller 38 sets an operation mode, polarity inversion driving and polarity inversion timing, and supplies a vertical synchronous signal and a horizontal synchronous signal generated inside the controller to the data driver 30 and the gate driver 32.

While the liquid crystal device 10 includes the power supply circuit 100 and the display controller 38 in FIG. 1, at least one of them can be provided outside the liquid crystal device 10. Also, the host may be included in the liquid crystal device 10.

Furthermore, the data driver 30 may incorporate at least one of the gate driver 32 and the power supply circuit 100.

Any or all of the data driver 30, the gate driver 32, the display controller 38, and the power supply circuit 100 may be provided on the liquid crystal display panel 20. For example, the data driver 30, the gate driver 32, and the power supply circuit 100 are provided on the liquid crystal display panel 20 referring to FIG. 2. The liquid crystal display panel 20 therefore may have a configuration including a plurality of scanning lines, a plurality of data lines, a pixel electrode that is defined by one of the plurality of scanning lines and one of the plurality of data lines, an opposing electrode that is placed face to face with the pixel electrode with an electro-optic material therebetween, a scanning driver that scans the plurality of scanning lines, a data driver that drives the plurality of data lines, and a power supply circuit that supplies opposing-electrode voltage to the opposing electrode. In a pixel forming area 80 included in the liquid crystal display panel 20, a plurality of pixels are provided.

1.1 Polarity Inversion Driving Method

To drive a liquid crystal to create a display, it is necessary to periodically discharge a liquid crystal capacitance to eliminate accumulated electrical charges in view of durability and contrast of the liquid crystal. For this purpose, the liquid crystal device 10 uses a polarity inversion driving method to invert the polarity of the voltage applied to the liquid crystal at a predetermined interval. Examples of this polarity inversion driving method may include frame inversion driving and line inversion driving.

Frame inversion driving refers to a method to invert the polarity of the voltage applied to a liquid crystal on a frame-by-frame basis, while line inversion driving refers to a method to invert the polarity of the voltage applied to a liquid crystal on a line-by-line basis. If attention is focused on each line, the line inversion driving method also inverts the polarity of the voltage applied to a liquid crystal on a frame-by-frame basis.

Figure 3A:
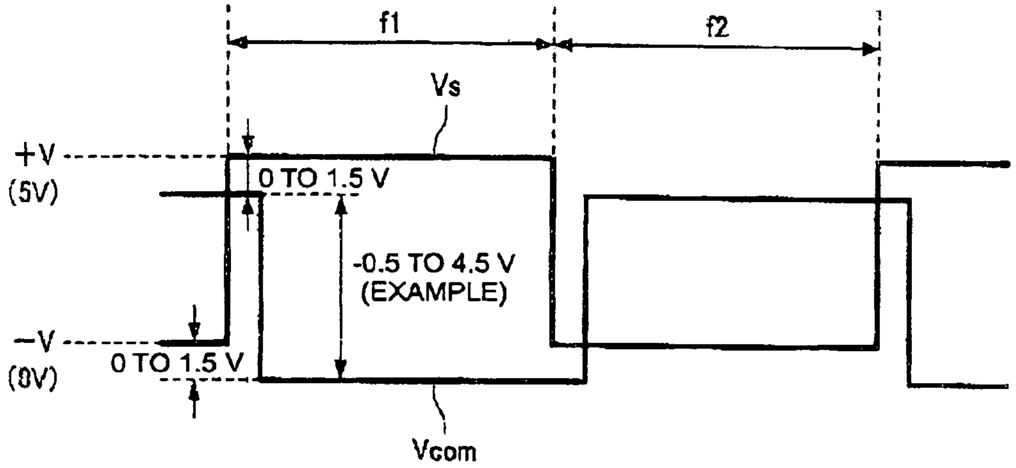
FIGS. 3A and 3B are diagrams illustrating operation of frame inversion driving.
Figure 3B:
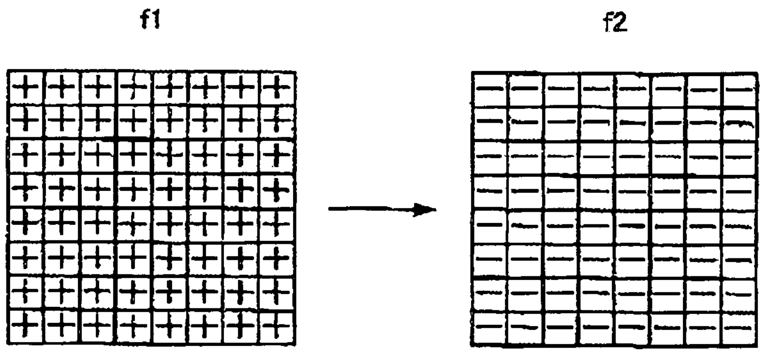

FIGS. 3A and 3B are diagrams illustrating operation of frame inversion driving. FIG. 3A schematically shows waveforms of the driving voltage of a data line and the opposing-electrode voltage Vcom in frame inversion driving. FIG. 3B schematically shows the polarity of the voltage applied to a liquid crystal corresponding to individual pixels for every frame in frame inversion driving.

In frame inversion driving, the polarity of the driving voltage applied to a data line is inverted every frame period as shown in FIG. 3A. Therefore, voltage Vs supplied to the source of a TFT coupled to the data line has positive polarity "+V" in a frame f1, and has negative polarity "−V" in a subsequent frame f2. Meanwhile, the opposing-electrode voltage Vcom supplied to the opposing electrode placed face to face with the pixel electrode coupled to the drain electrode of the TFT is also inverted in sync with the polarity inversion timing of the driving voltage of the data line.

Since a voltage difference between the pixel electrode and the opposing electrode is applied to the liquid crystal, a positive voltage is applied in the frame f1 and a negative voltage is applied in the frame f2 as shown in FIG. 3B.

Figure 4A:
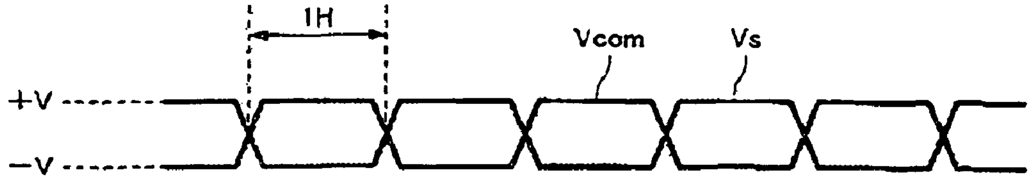
FIGS. 4A and 4B are diagrams illustrating operation of line inversion driving.
Figure 4B:
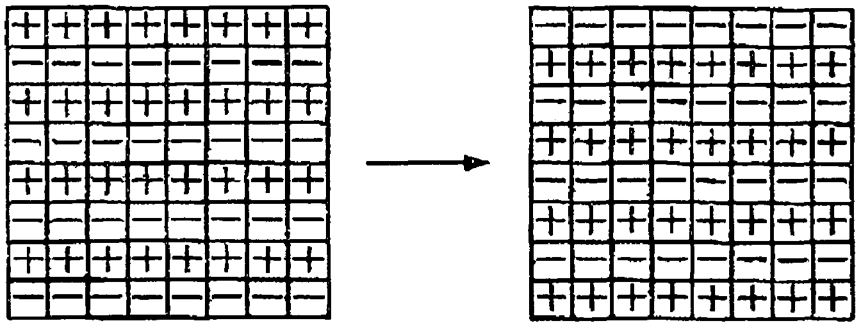

FIGS. 4A and 4B are diagrams illustrating operation of line inversion driving. FIG. 4A schematically shows waveforms of the driving voltage of a data line and the opposing-electrode voltage Vcom in line inversion driving. FIG. 4B schematically shows the polarity of the voltage applied to a liquid crystal corresponding to individual pixels for every frame in line inversion driving.

In line inversion driving, the polarity of the driving voltage applied to a data line is inverted every horizontal scanning period (1H) and every frame period as shown in FIG. 4A. Therefore, in a frame f1, the voltage Vs supplied to the source of a TFT coupled to the data line has positive polarity "+V" in 1H and has negative polarity "−V" in 2H. In a frame f2, the voltage Vs has negative polarity "−V" in 1H and has positive polarity "+V" in 2H.

Meanwhile, the opposing-electrode voltage Vcom supplied to the opposing electrode placed face to face with the pixel electrode coupled to the drain electrode of the TFT is also inverted in sync with the polarity inversion timing of the driving voltage of the data line.

A voltage difference between the pixel electrode and the opposing electrode is applied to the liquid crystal. Therefore, by inverting the polarity for every scanning line, for example, voltage whose polarity is inverted on a line-by-line basis is applied every frame period as shown in FIG. 4B.

2. Power Supply Circuit

The power supply circuit 100 has a function as an opposing-electrode voltage supply circuit, and supplies a voltage to the opposing electrode placed face to face with the pixel electrode with the liquid crystal as an electro-optic material therebetween. The power supply circuit 100 supplies the higher-potential voltage VCOMH or the lower-potential voltage VCOML to the opposing electrode in line with polarity inversion timing.

Figure 5:
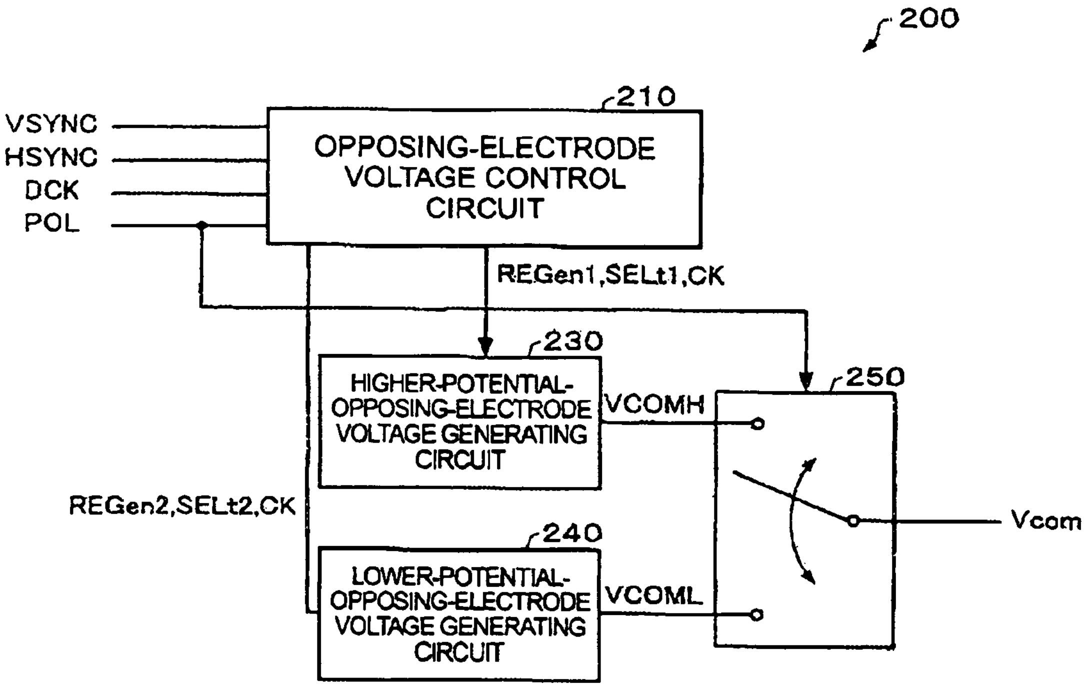
FIG. 5 is a block diagram showing an example configuration of an opposing-electrode voltage supply circuit included in the power supply circuit according to the present embodiment.

FIG. 5 is a block diagram showing an example configuration of an opposing-electrode voltage supply circuit included in the power supply circuit 100.

This opposing-electrode voltage supply circuit 200 includes an opposing-electrode voltage control circuit 210, a higher-potential-opposing-electrode voltage generating circuit 230 (a voltage supply circuit in a broad sense), a lower-potential-opposing-electrode voltage generating circuit 240 (a voltage supply circuit in a broad sense), and a selection circuit 250. The higher-potential-opposing-electrode voltage generating circuit 230 generates the higher-potential voltage VCOMH to be supplied to the opposing electrode. The lower-potential-opposing-electrode voltage generating circuit 240 generates the lower-potential voltage VCOML to be supplied to the opposing electrode. The selection circuit 250 selects either the higher-potential voltage VCOMH or the lower-potential voltage VCOML in line with polarity inversion timing, and outputs the selected voltage as the opposing-electrode voltage Vcom. The opposing-electrode voltage control circuit 210 controls the higher-potential-opposing-electrode voltage generating circuit 230, the lower-potential-opposing-electrode voltage generating circuit 240, and the selection circuit 250. The higher-potential-opposing-electrode voltage generating circuit 230 switches the voltage of the opposing electrode to which the lower-potential voltage VCOML (first voltage) is supplied to the higher-potential voltage VCOMH (second voltage), and supplies the switched voltage to the opposing electrode. The lower-potential-opposing-electrode voltage generating circuit 240 switches the voltage of the opposing electrode to which the higher-potential voltage VCOMH is supplied to the lower-potential voltage VCOML, and supplies the switched voltage to the opposing electrode.

Figure 6:
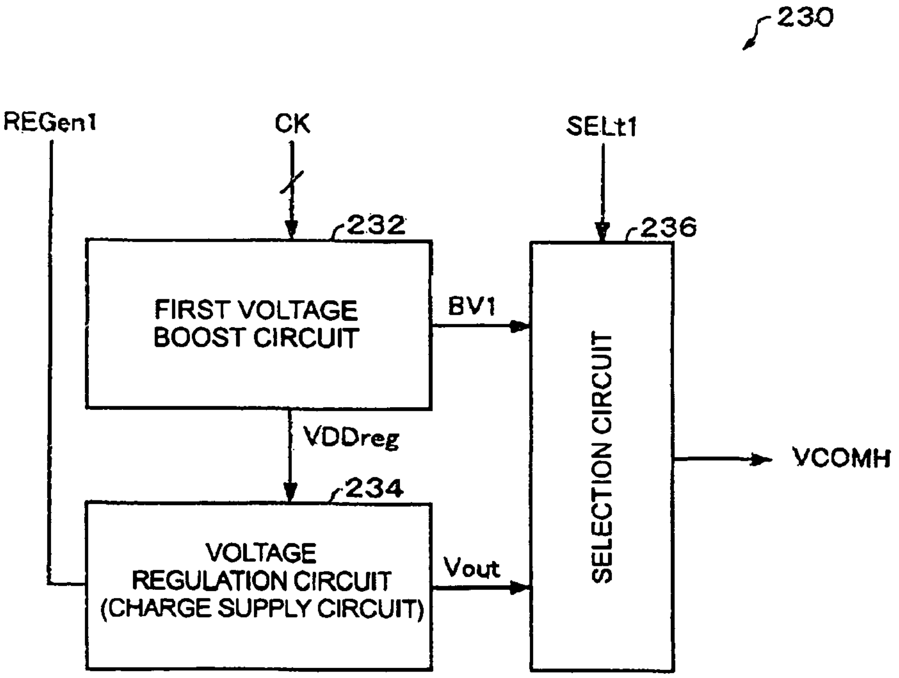
FIG. 6 is a block diagram showing a first example configuration of the higher-potential-opposing-electrode voltage generating circuit.

FIG. 6 is a block diagram showing a first example configuration of the higher-potential-opposing-electrode voltage generating circuit 230.

The higher-potential-opposing-electrode voltage generating circuit 230 includes a first voltage boost circuit 232, a voltage regulation circuit 234 (a charge supply circuit in a broad sense), and a selection circuit 236.

The first voltage boost circuit 232 includes a switching element for generating boosted voltage BV1 boosted by charge-pump operation. The first voltage boost circuit 232 performs the charge-pump operation to boost voltage corresponding to charges accumulated in a capacitance element by turning on or off the switching element in response to one or more voltage boost clocks from the opposing-electrode voltage control circuit 210.

The voltage regulation circuit 234 works as a charge supply circuit, and supplies charges such that the opposing electrode is maintained (fixed, stabilized, adjusted) at a predetermined voltage (higher-potential voltage VCOMH). A higher-potential power supply voltage VDDreg (or lower-potential power supply voltage) of the voltage regulation circuit 234 is generated by the first voltage boost circuit 232. The voltage regulation circuit 234 starts supplying charges to produce output voltage Vout, thereby supplying charges to the opposing electrode. The voltage regulation circuit 234 starts or stops supplying charges by an enable signal REGen1 from the opposing electrode voltage control circuit 210. To stop supplying charges, an operating current of the voltage regulation circuit 234 is stopped or limited.

The selection circuit 236 selects and outputs either the boosted voltage BV1 or the output voltage Vout as the higher-potential voltage VCOMH based on a selection signal SELt1 from the opposing-electrode voltage control circuit 210. Specifically, the selection circuit 236 supplies the boosted voltage BV1 generated by the first voltage boost circuit to the opposing electrode, and then the voltage regulation circuit 234 (charge supply circuit) supplies charges to the opposing electrode so as to maintain the voltage of the opposing electrode at the higher-potential voltage VCOMH.

Figure 7:
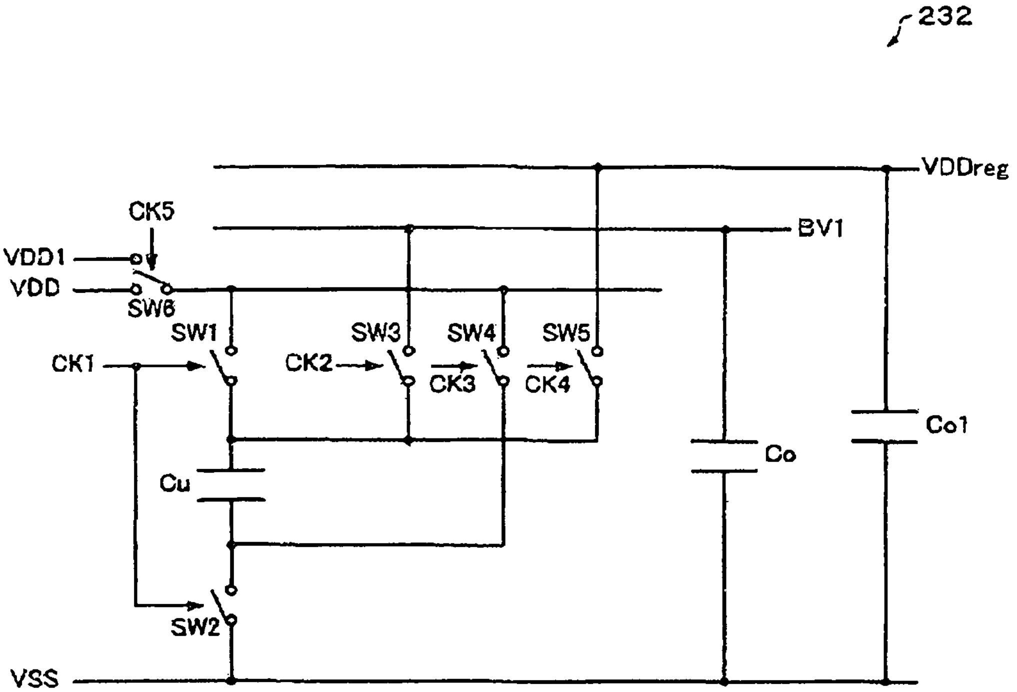
FIG. 7 is a diagram showing an example configuration of the first voltage boost circuit shown in FIG. 6.

FIG. 7 is a diagram showing an example configuration of the first voltage boost circuit 232 shown in FIG. 6.

Figure 8:
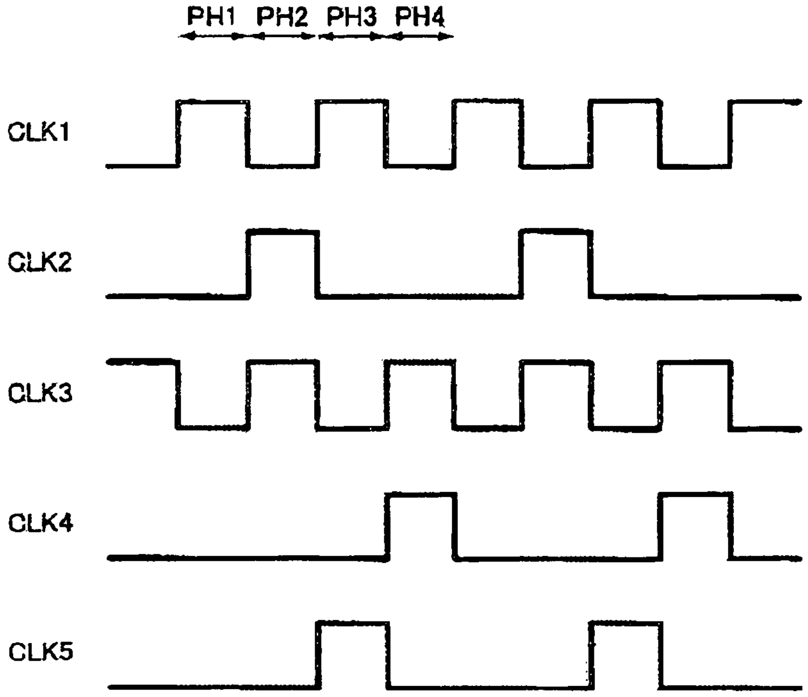
FIG. 8 is a schematic timing diagram showing voltage boost clocks to perform charge-pump operation of the first voltage boost circuit shown in FIG. 7.

FIG. 8 is a schematic timing diagram showing voltage boost clocks to perform the charge-pump operation of the first voltage boost circuit 232 shown in FIG. 7.

While the configuration used in FIGS. 7 and 8 doubles power supply voltages (system power supply voltages) VDD and VDD1 (VDD1>VDD) by the charge-pump operation, the invention is not limited to this.

Generating a voltage boosted by the charge-pump operation requires a capacitance element besides switching elements. Referring to FIG. 7, a voltage boost capacitance Cu and storage capacitances Co and Co1 are provided to generate the boosted voltage BV1 and the higher-potential power supply voltage VDDreg of the voltage regulation circuit 234.

Switching elements SW1 to SW5 are in the conductive state when a voltage boost clock is at the H level. A switching element SW6 is coupled to the power supply voltage VDD side when the voltage boost clock CK5 is at the L level, and coupled to the power supply voltage VDD1 side when it is at the H level.

In a phase PH1 shown in FIG. 8, the switching element SW6 is coupled to the power supply voltage VDD side, and the power supply voltages VDD and VSS are supplied to the both ends of the voltage boost capacitance Cu. In a subsequent phase PH2, the switching elements SW1 and SW2 are turned to the nonconductive state while the switching elements SW3 and SW4 are turned to the conductive state, and a voltage twice as large as the power supply voltages VDD and VSS is supplied to the storage capacitance Co. Accordingly, charges corresponding to the voltage twice as large as the power supply voltages VDD and VSS are accumulated in the storage capacitance Co, thereby generating a voltage corresponding to the charges accumulated in the storage capacitance Co as the boosted voltage BV1.

In a phase PH3 shown in FIG. 8, the switching element SW6 is coupled to the power supply voltage VDD1 side, and the power supply voltages VDD1 and VSS are supplied to the both ends of the voltage boost capacitance Cu. In a subsequent phase PH4, the switching elements SW1 and SW2 are turned to the nonconductive state while the switching elements SW4 and SW5 are turned to the conductive state, and a voltage twice as large as the power supply voltages VDD1 and VSS is supplied to the storage capacitance Co1. Accordingly, charges corresponding to the voltage twice as large as the power supply voltages VDD1 and VSS are accumulated in the storage capacitance Co1, thereby generating a voltage corresponding to the charges accumulated in the storage capacitance Co1 as the higher-potential power supply voltage VDDreg. The boosted voltage BV1 is lower than the higher-potential power supply voltage VDDreg.

While the first voltage boost circuit 232 incorporates the voltage boost capacitance Cu and the storage capacitances Co and Co1 referring to FIG. 7, these capacitances are preferably provided outside the first voltage boost circuit 232, the higher-potential-opposing-electrode voltage generating circuit 230, the opposing-electrode voltage supply circuit 200, or the power supply circuit 100 in a way that they contribute to the charge-pump operation together with the switching elements SW1 to SW6 included in the first voltage boost circuit 232.

Figure 9:
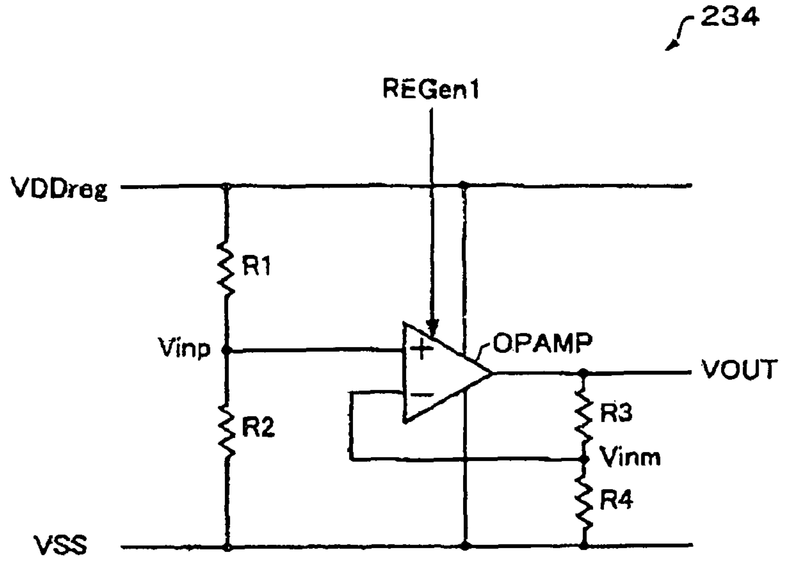
FIG. 9 is a circuit diagram showing an example configuration of the voltage regulation circuit shown in FIG. 6.

FIG. 9 is a circuit diagram showing an example configuration of the voltage regulation circuit 234 shown in FIG. 6.

The voltage regulation circuit 234 includes an operational amplifier OPAMP. The operational amplifier OPAMP works using the higher-potential power supply voltage VDDreg and the lower-potential power supply voltage (system ground power supply voltage) VSS as power supply voltages. The configuration of this operational amplifier OPAMP is publicly known and thus a detailed description thereof is omitted here. The operational amplifier OPAMP includes a differential amplifier circuit and an output circuit. Based on an output from the differential amplifier circuit, the output circuit produces the output voltage Vout. By stopping or limiting an operating current that a current source included in the differential amplifier circuit generates, operation of the differential amplifier circuit is stopped, and thus operation of the charge supply circuit is stopped.

Between one power source line to which the higher-potential power supply voltage VDDreg is supplied and another power source line to which the lower-potential power supply voltage VSS is supplied, resistive elements R1 and R2 are connected in series. Voltage of a connection node of the resistive elements R1 and R2 is supplied to a noninverting input terminal (+) (first input terminal) of the operational amplifier OPAMP as input voltage Vinp (reference voltage).

Between the output of the operational amplifier OPAMP and the power source line to which the lower-potential power supply voltage VSS is supplied, resistive elements R3 and R4 are connected in series. Voltage Vinm of a connection node of the resistive elements R3 and R4 is supplied to an inverting input terminal (−) (second input terminal) of the operational amplifier OPAMP. Resistance ratios between the resistive elements R1 and R2, and the resistive elements R3 and R4 are set so as to make the voltages Vinp and Vinm equal.

Figure 10:
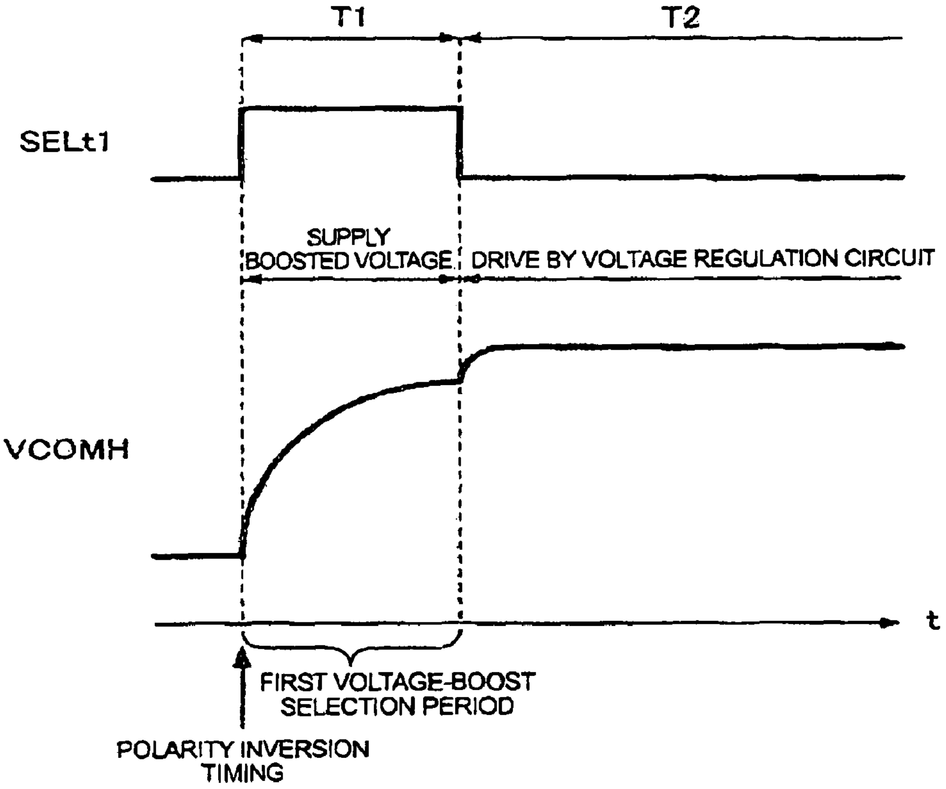
FIG. 10 is a timing diagram showing an example operation of the higher-potential-opposing-electrode voltage generating circuit shown in FIG. 6.

FIG. 10 is a timing diagram showing an example operation of the higher-potential-opposing-electrode voltage generating circuit 230 shown in FIG. 6.

As shown in FIG. 5, the selection circuit 250 selects and outputs either the higher-potential voltage VCOMH or the lower-potential voltage VCOML generated by the lower-potential-opposing-electrode voltage generating circuit 240 as the opposing-electrode voltage Vcom. This switching is in sync with polarity inversion timing.

In the higher-potential-opposing-electrode voltage generating circuit 230 shown in FIG. 6, after the selection circuit 250 shown in FIG. 5 selects and outputs the higher-potential voltage VCOMH at polarity inversion timing (at an edge of the polarity inversion signal POL), the selection circuit 236 shown in FIG. 6 supplies the boosted voltage BV1 to the opposing electrode as described above. In other words, a first voltage-boost selection period T1 (first period) with the selection signal SELt1 at the H level is specified during which the boosted voltage BV1 is directly supplied to the opposing, electrode as the higher-potential voltage VCOMH.

Subsequently, a period T2 (second period) with the selection signal SELt1 at the L level is specified, and the voltage regulation circuit 234 (charge supply circuit) supplies charges to the opposing electrode so as to maintain the voltage of the opposing electrode at the higher-potential voltage VCOMH.

During the first voltage-boost selection period T1, an operating current of the voltage regulation circuit 234 is preferably stopped or limited to stop the supply of charges.

Accordingly, since the voltage regulation circuit 234 drives the opposing electrode, it is possible to prevent a voltage decrease due to a leak between the opposing and pixel electrodes and thus to prevent picture quality from degrading compared to a case for supplying a voltage boosted by the charge-pump operation as the higher-potential voltage VCOMH directly to the opposing electrode. As a result, there is no need to have a large-capacity capacitance element and a low-leak liquid crystal display panel, and thereby involving no cost increase.

An output from the first voltage boost circuit 232 is used for switching the opposing-electrode voltage Vcom supplied to the opposing electrode from the lower-potential voltage VCOML to the higher-potential voltage VCOMH. Consequently, it is possible to reduce power consumption to drive the voltage regulation circuit 234 in switching the opposing-electrode voltage Vcom from the lower-potential voltage VCOML to the higher-potential voltage VCOMH. After a predetermined period of time following the switch from the lower-potential voltage VCOML to the higher-potential voltage VCOMH, the voltage regulation circuit 234 produces the output voltage Vout as the higher-potential voltage VCOMH, thereby supplying the higher-potential voltage VCOMH as a highly accurate voltage level. Furthermore, since the voltage regulation circuit 234 does not have to switch the opposing-electrode voltage Vcom from the lower-potential voltage VCOML to the higher-potential voltage VCOMH swiftly after polarity inversion, it is possible to reduce a driving capacity of the voltage regulation circuit 234. Therefore, even assuming that the voltage regulation circuit 234 supplies charges, its power consumption can be lowered and its circuit scale can be reduced.

While the above-described embodiment uses the voltage supply circuit that switches a first voltage supplied to an electrode to a second voltage and supplies the second voltage to the electrode, it should be understood that a voltage supply circuit that switches the voltage of an electrode to which the second voltage is supplied to the first voltage and supplies the switched voltage to the electrode is also available. In this case, the voltage supply circuit includes a first voltage boost circuit having a switching element for generating boosted voltage boosted by charge-pump operation and a charge supply circuit for supplying charges to the electrode. In switching the second voltage to the first voltage, the voltage supply circuit supplies the boosted voltage to the electrode, and then supplies charges to the electrode so as to maintain the voltage of the electrode at the first voltage.

While the higher potential opposing-electrode voltage generating circuit 230 shown in FIG. 5 is described referring to FIGS. 6 through 10, the lower-potential-opposing-electrode voltage generating circuit 240 shown in FIG. 5 is also used in the same manner. In other words, those skilled in the art can embody that by replacing “the higher-potential voltage VCOMH” with “the lower-potential voltage VCOML” in the description of the higher-potential-opposing-electrode voltage generating circuit 230.

Figure 11:
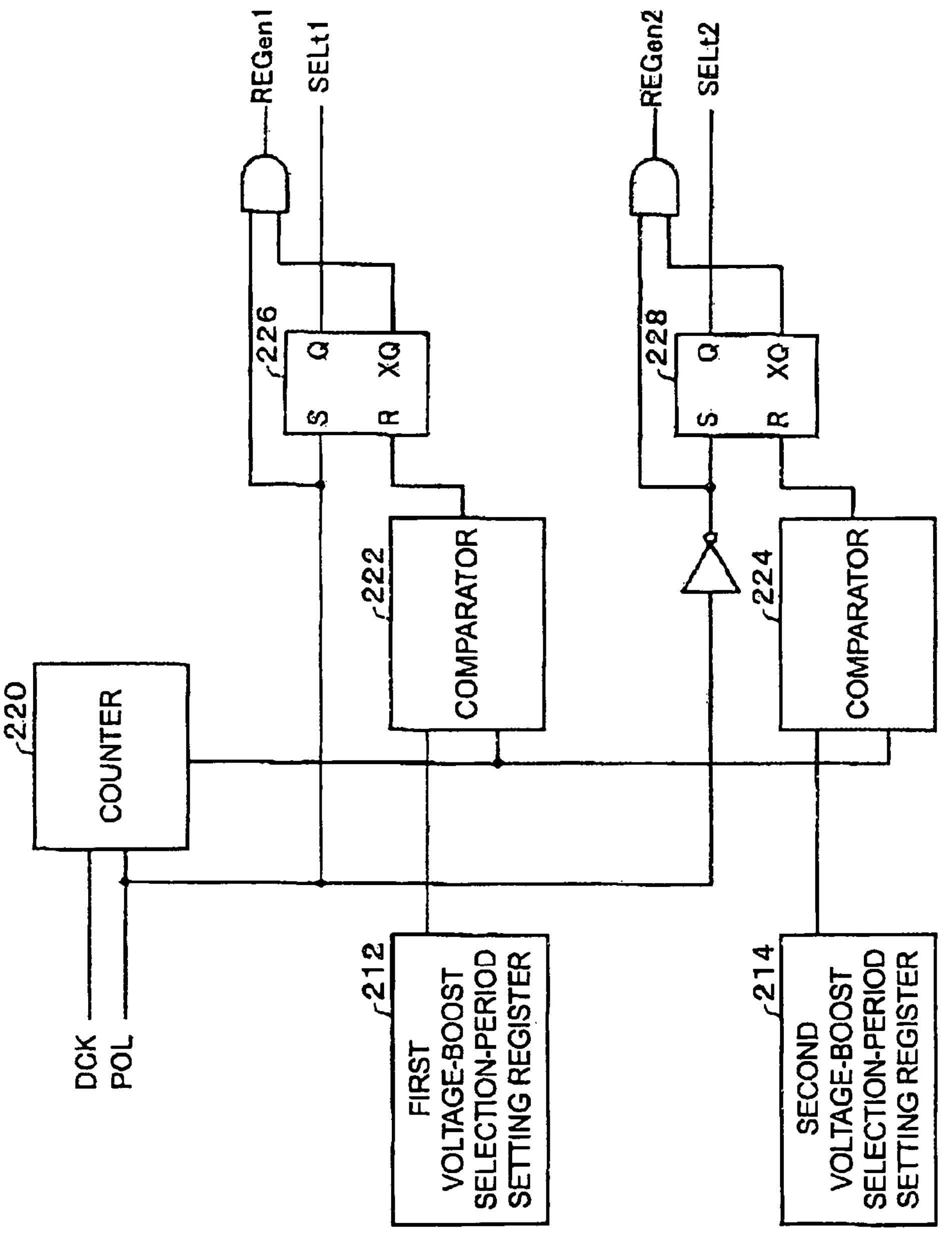
FIG. 11 is a block diagram showing an example configuration of the opposing-electrode voltage control circuit shown in FIG. 5.

FIG. 11 is a block diagram showing an example configuration of the opposing-electrode voltage control circuit 210 shown in FIG. 5.

FIG. 11 shows a configuration that generates the enable REGen1 and the selection signal SEt1 to the higher-potential-opposing-electrode voltage generating circuit 230, and an enable REGen2 and a selection signal SELt2 to the lower-potential-opposing-electrode voltage generating circuit 240. The enable REGen2 refers to an enable signal to a voltage regulation circuit included in the lower-potential-opposing-electrode voltage generating circuit 240 corresponding to the voltage regulation circuit 234 included in the higher-potential-opposing-electrode voltage generating circuit 230. The selection signal SELt2 refers to a selection signal to a selection circuit included in the lower-potential-opposing-electrode voltage generating circuit 240 corresponding to the selection circuit 236 included in the higher-potential-opposing-electrode voltage generating circuit 230.

The opposing-electrode voltage control circuit 210 includes a first voltage-boost selection-period setting register 212 and a second voltage-boost selection-period setting register 214. In the first voltage-boost selection-period setting register 212, a value to specify the length of a period (the first voltage-boost selection period T1 shown in FIG. 10) during which the selection signal SELt1 is set at the H level is set by the display controller 38, for example. In the second voltage-boost selection-period setting register 214, a value to specify another period during which the selection signal SELt2 of the lower-potential-opposing-electrode voltage generating circuit 240 is at the H level is set by the display controller 38, for example.

The opposing-electrode voltage control circuit 210 includes a counter 220, comparators 222 and 224, and RS flip-flops (FF) 226 and 228.

The counter 220 counts up in sync with a dot clock DCK based on a switching point of the polarity inversion signal POL. The dot clock DCK refers to a synchronous clock whose timing for supplying display data per dot is in sync with the data driver 30.

The comparator 222 compares a count value of the counter 220 and the set value of the first voltage-boost selection-period setting register 212, and outputs a pulse when the two coincide with each other. The RSFF 226 is set when the polarity inversion signal POL is turned to the H level, and reset when the comparator 222 detects the count value of the counter 220 and the set value of the first voltage-boost selection-period setting register 212 coincide with each other. The selection signal SELt1 is a signal of an output terminal Q of the RSFF 226. Accordingly, operation starts when the polarity inversion signal POL is turned to the H level, and the first period T1 having a period corresponding the set value of the first voltage-boost selection-period setting register 212 is specified.

The comparator 224 compares a count value of the counter 220 and the set value of the second voltage-boost selection-period setting register 214, and outputs a pulse when the two coincide with each other. The RSFF 228 is set when the polarity inversion signal POL is turned to the L level, and reset when the comparator 224 detects the count value of the counter 220 and the set value of the second voltage-boost selection-period setting register 214 coincide with each other. The selection signal SELt2 is a signal of an output terminal Q of the RSFF 228. Accordingly, operation starts when the polarity inversion signal POL is turned to the L level, and the first period having a period corresponding the set value of the second voltage-boost selection-period setting register 214 is specified.

Referring to FIG. 11, the enable REGen1 is generated by performing a logic operation of a signal of an inverting output terminal XQ of the RSFF 226 and the polarity inversion signal POL. Accordingly, the enable REGen1 is set at the H level during a period in which the polarity inversion signal POL is at the H level and the selection signal SELt1 is at the L level. Therefore, it is easily possible to stop the voltage regulation circuit 234 supplying charges when the enable REGen1 is at the L level.

In the same manner, the enable REGen2 is generated by performing a logic operation of a signal of an inverting output terminal XQ of the RSFF 228 and an inverted signal of the polarity inversion signal POL. Accordingly, the enable REGen2 is set at the H level during a period in which the polarity inversion signal POL is at the L level and the selection signal SELt2 is at the L level. Therefore, it is easily possible to stop the voltage regulation circuit of the lower-potential-opposing-electrode voltage generating circuit 240 supplying charges when the enable REGen2 is at the L level.

Figure 12:
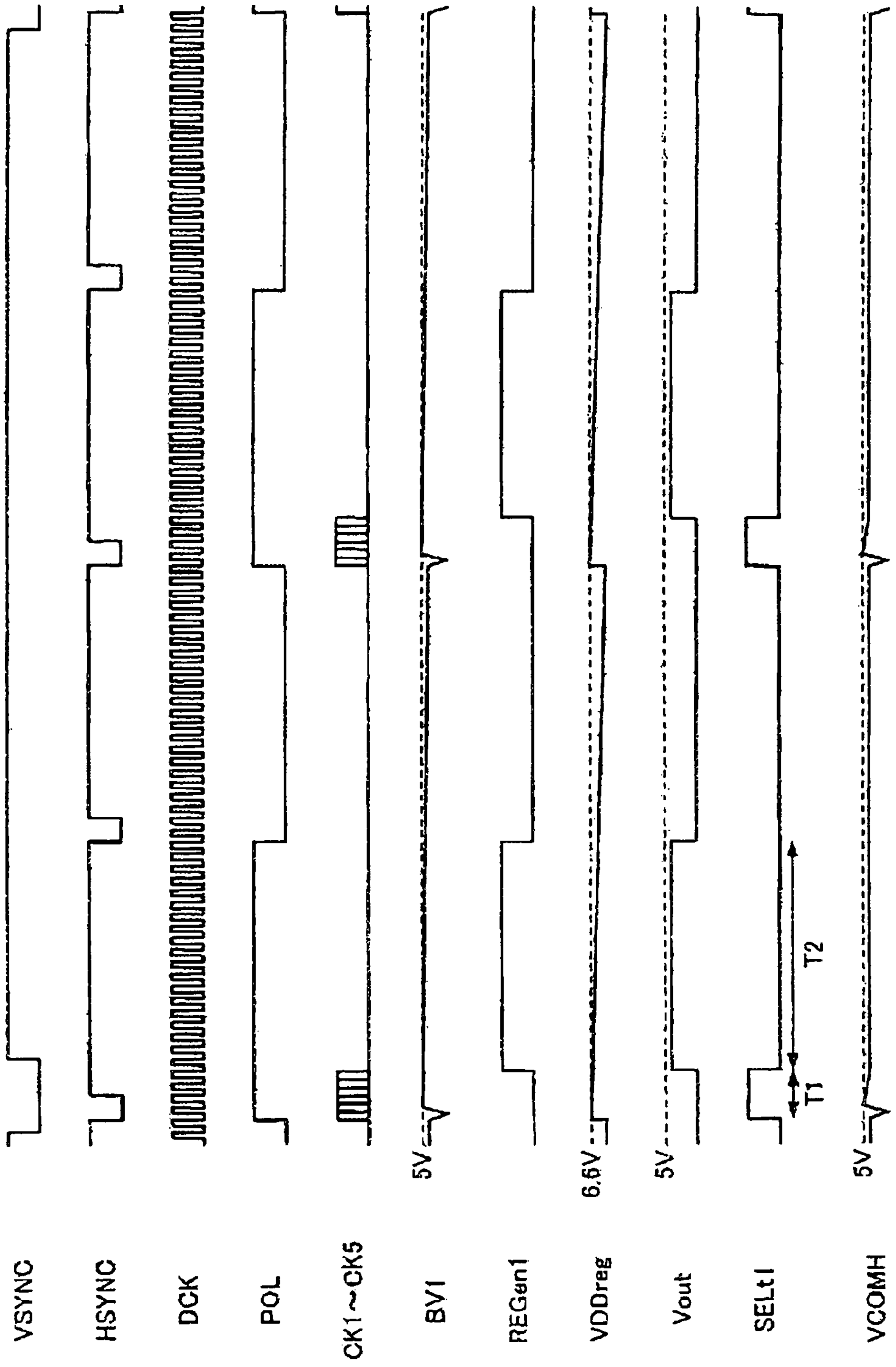
FIG. 12 is a timing diagram showing an example operation of the higher-potential-opposing-electrode voltage generating circuit shown in FIG. 6.

FIG. 12 is a tiring diagram showing an example operation of the higher-potential-opposing-electrode voltage generating circuit 230.

This diagram shows line inversion driving. When the polarity inversion signal POL changes from the L level to the H level, the first voltage-boost selection period T1 starts based on this change point, thereby the voltage-boost clocks CK1 to CK5 are supplied. Then the boosted voltage BV1 and the power supply voltage VDDreg are generated and output as the higher-potential voltage VCOMH of the opposing electrode. Here, the enable REGen1 is turned to the L level, stopping the voltage regulation circuit 234 supplying charges.

The enable REGen1 is turned to the H level in the subsequent period T2, making the voltage regulation circuit 234 start to supply charges. Then the output voltage Vout is output as the higher-potential voltage VCOMH of the opposing electrode.

While FIG. 12 shows one example operation of the higher-potential-opposing-electrode voltage generating circuit 230, the same can be said for operation of the lower-potential-opposing-electrode voltage generating circuit 240. In the lower-potential-opposing-electrode voltage generating circuit 240, when the polarity inversion signal POL changes from the H level to the L level, boosted voltage is firstly output, and then the voltage regulation circuit supplies charges to the opposing electrode so as to maintain the lower-potential voltage VCOML.

2.1 Modification

While the first voltage boost circuit 232 included in the higher-potential-opposing-electrode voltage generating circuit 230 generates the higher-potential power supply voltage VDDreg of the voltage regulation circuit 234 referring to FIG. 6, the invention is not limited to this.

In one modification, a second voltage boost circuit that generates the higher-potential power supply voltage VDDreg is provided besides the first voltage boost circuit 232, which provides the boosted voltage BV1.

Figure 13:
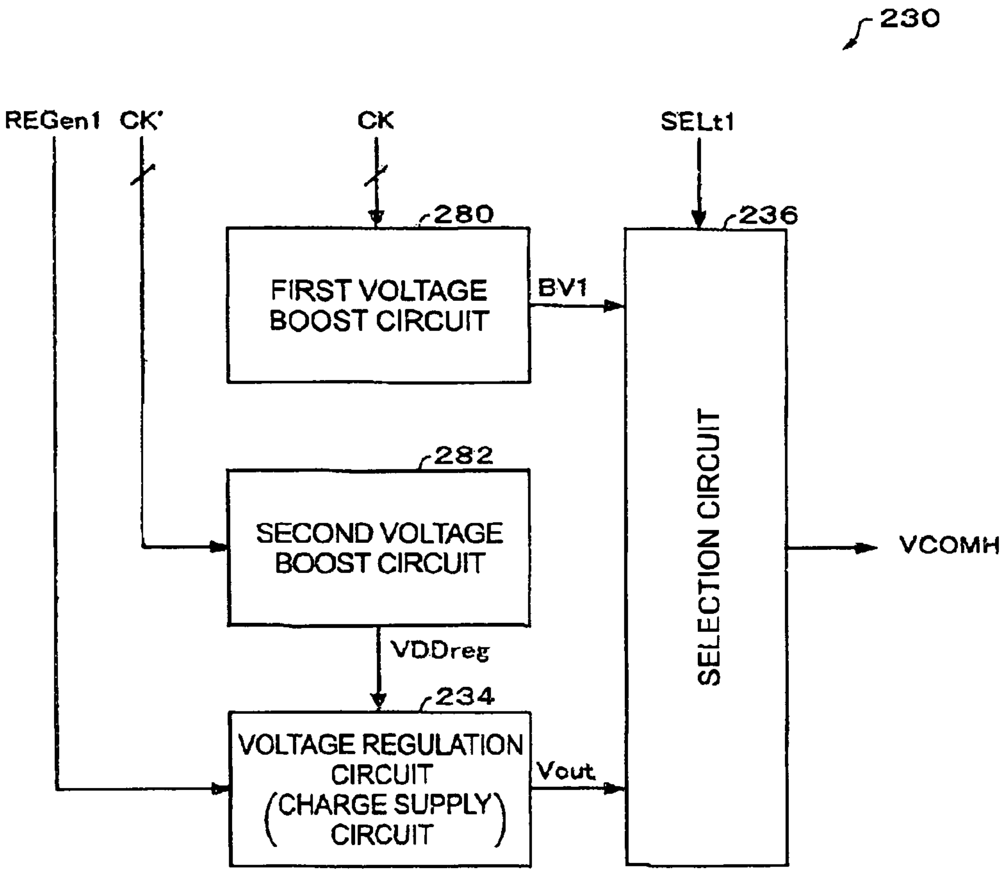
FIG. 13 is a block diagram showing a second example configuration of the higher-potential-opposing-electrode voltage generating circuit.

FIG. 13 is a block diagram showing a second example configuration of the higher-potential-opposing-electrode voltage generating circuit 230. The parts same as shown in FIG. 6 are given the same numerals in FIG. 13 and explanation thereof will be omitted.

Referring to FIG. 13, a first voltage boost circuit 280 includes a switching element for generating the boosted voltage BV1 boosted by charge-pump operation. The first voltage boost circuit 280 performs the charge-pump operation to boost voltage corresponding to charges accumulated in a capacitance element by turning on and off the switching element in response to one or more voltage boost clocks from the opposing-electrode voltage control circuit 210.

A second voltage boost circuit 282 includes a switching element for generating the boosted voltage BV1 boosted by charge-pump operation. The second voltage boost circuit 282 performs the charge-pump operation to boost voltage corresponding to charges accumulated in a capacitance element by turning on or off the switching element in response to one or more voltage boost clocks from the opposing-electrode voltage control circuit 210.

Figure 14:
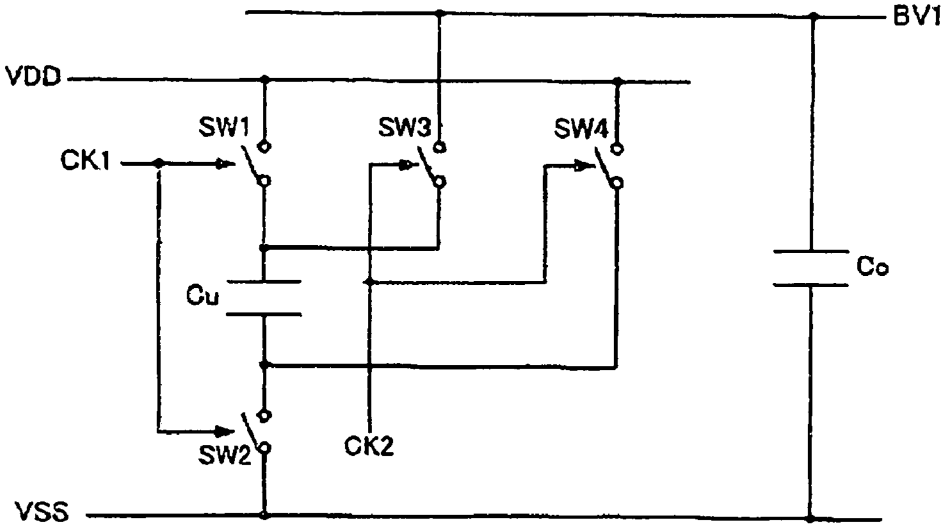
FIG. 14 is a circuit diagram showing an example configuration of the first voltage boost circuit shown in FIG. 13.

FIG. 14 is a circuit diagram showing an example configuration of the first voltage boost circuit 280 shown in FIG. 13.

Figure 15:
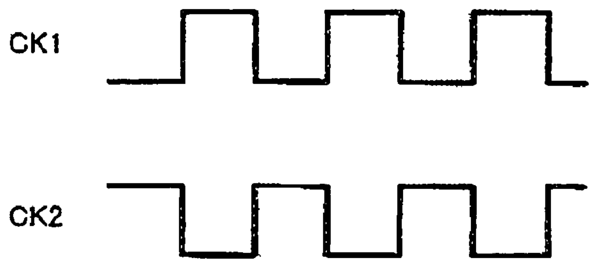
FIG. 15 is a schematic timing diagram showing voltage boost clocks to perform the charge-pump operation of the first voltage boost circuit shown in FIG. 14.

FIG. 15 is a schematic timing diagram showing voltage boost clocks to perform the charge-pump operation of the first voltage boost circuit 280 shown in FIG. 14.

While the configuration used in FIGS. 14 and 15 doubles the power supply voltage VDD by the charge-pump operation, the invention is not limited to this. The operation of this first voltage boost circuit 280 is the same as that shown in FIG. 7, and description thereof will be omitted. Also, the voltage boost capacitance Cu and the storage capacitance Co are preferably provided outside the first voltage boost circuit 280, the higher-potential-opposing-electrode voltage generating circuit 230, the opposing-electrode voltage supply circuit 200, or the power supply circuit 100 in a way that they contribute to the charge-pump operation together with the switching elements SW1 to SW4 included in the first voltage boost circuit 280.

The second voltage boost circuit 282 shown in FIG. 13 may have the same configuration as that shown in FIGS. 14 and 15. In this case, the power supply voltage VDD1, which has a higher potential than the power supply voltage VDD, is used instead of the power supply voltages VDD, and the higher-potential power supply voltage VDDreg is generated by boosting the voltage between the power supply voltages VDD1 and VSS.

Figure 16:
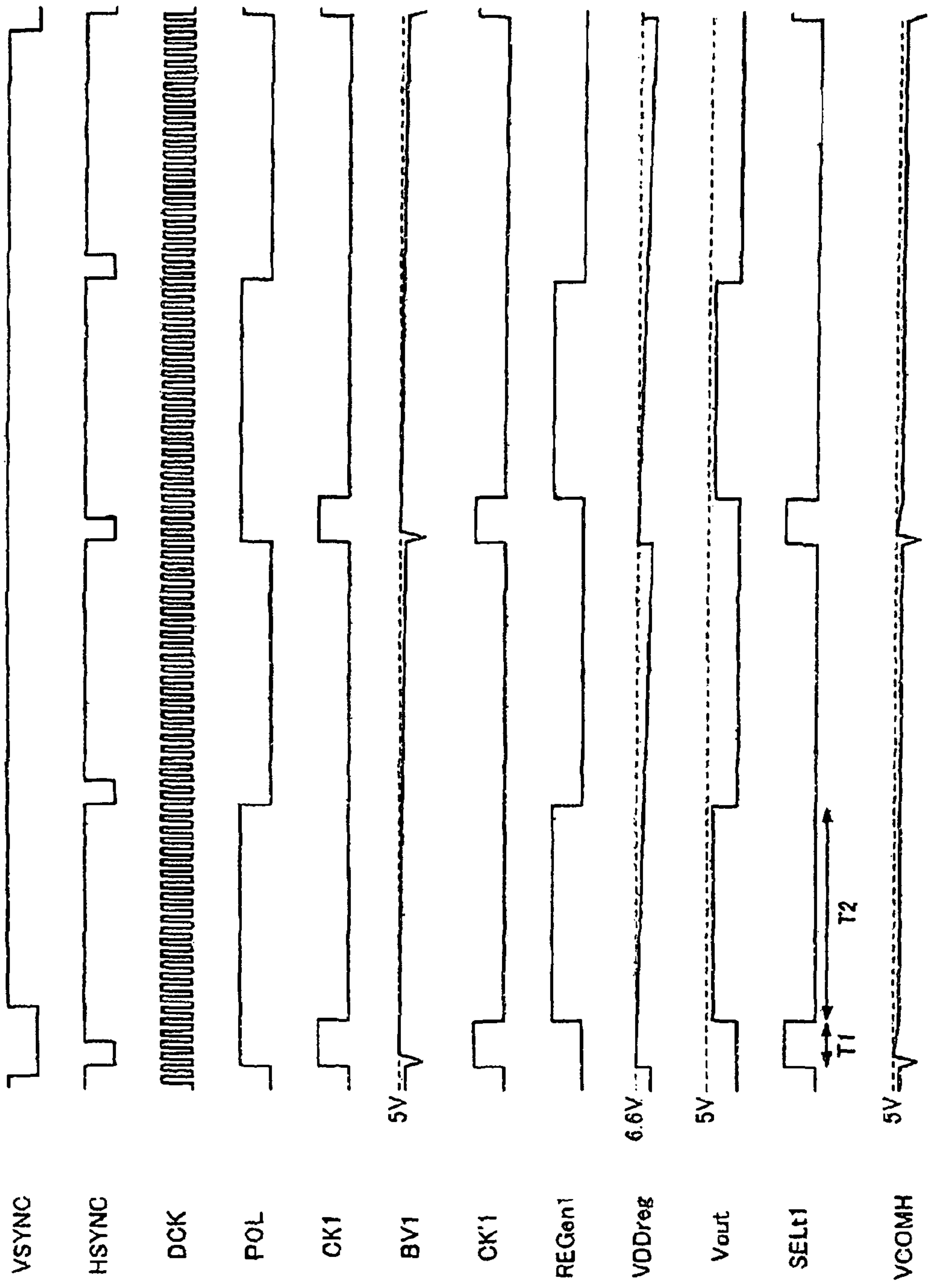
FIG. 16 is a timing diagram showing an example operation of the higher-potential-opposing-electrode voltage generating circuit in the second example configuration.

FIG. 16 is a timing diagram showing an example operation of the higher-potential-opposing-electrode voltage generating circuit 230 in the second example configuration.

In the same manner as the timing diagram of FIG. 12 showing the example operation of the higher-potential-opposing-electrode voltage generating circuit 230 with the first example configuration, when the polarity inversion signal POL changes from the L level to the H level, the first voltage-boost selection period T1 starts based on this change point, thereby the voltage-boost clocks CK1 to CK5 are supplied. Then the boosted voltage BV1 and the power supply voltage VDDreg are generated and output as the higher-potential voltage VCOMH of the opposing electrode. Here, the enable REGen1 is turned to the L level, stopping the voltage regulation circuit 234 supplying charges.

The enable REGen1 is turned to the H level in the subsequent period T2, making the voltage regulation circuit 234 start to supply charges. Then the output voltage Vout is output as the higher-potential voltage VCOMH of the opposing electrode.

While FIG. 13 shows one example operation of the higher-potential-opposing-electrode voltage generating circuit 230, the same can be said for operation of the lower-potential-opposing-electrode voltage generating circuit 240, and it should be understood that another voltage boost circuit can be provided to generate power supply voltage for the voltage regulation circuit.

3. Data Driver

Figure 2:
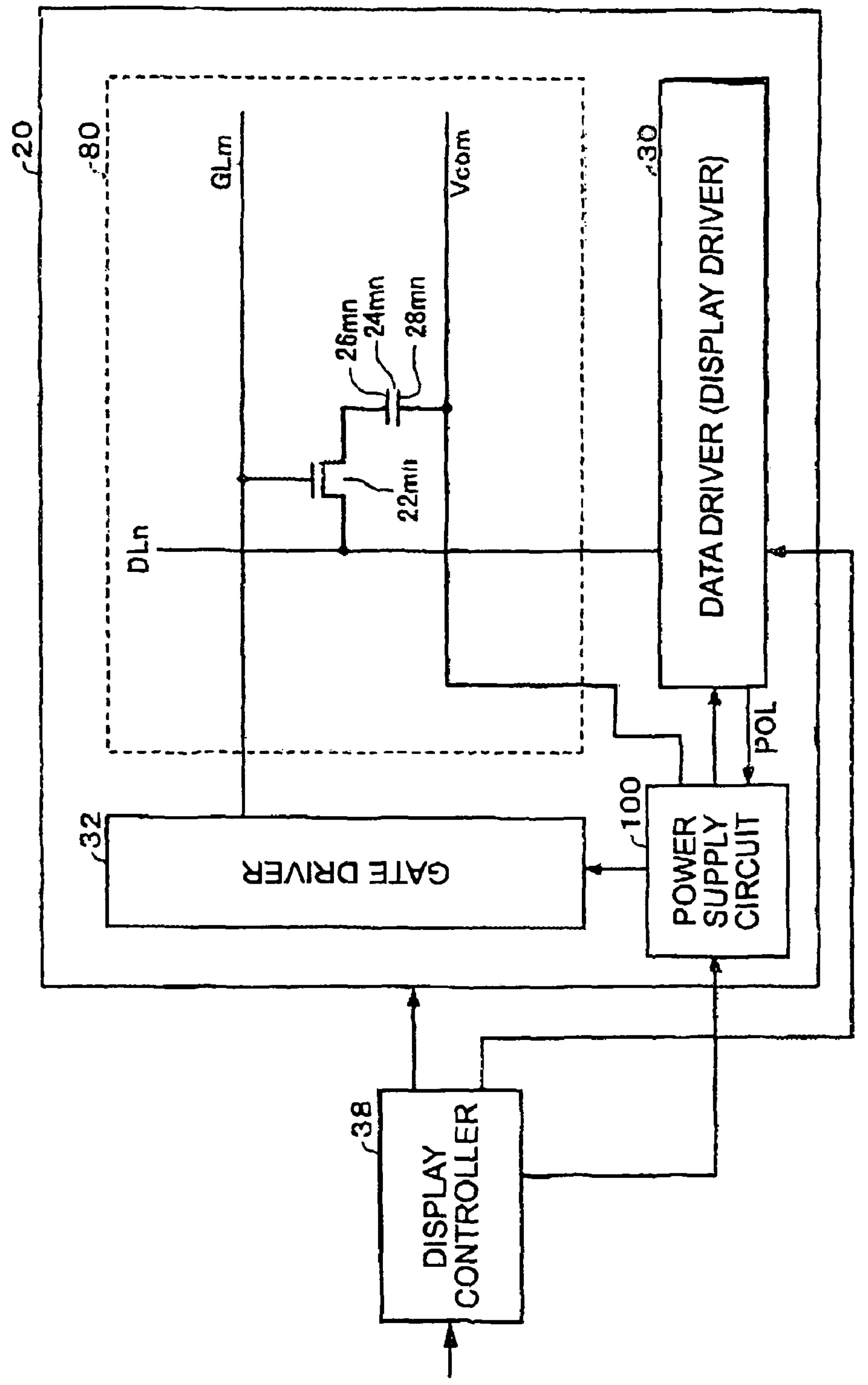
FIG. 2 schematically shows another configuration of a liquid crystal display according to the present embodiment.

The voltage supply circuit (opposing-electrode voltage supply circuit) according to the present embodiment or a power supply circuit including the voltage supply circuit can be incorporated in the data driver shown in FIG. 1 or 2.

Figure 17:
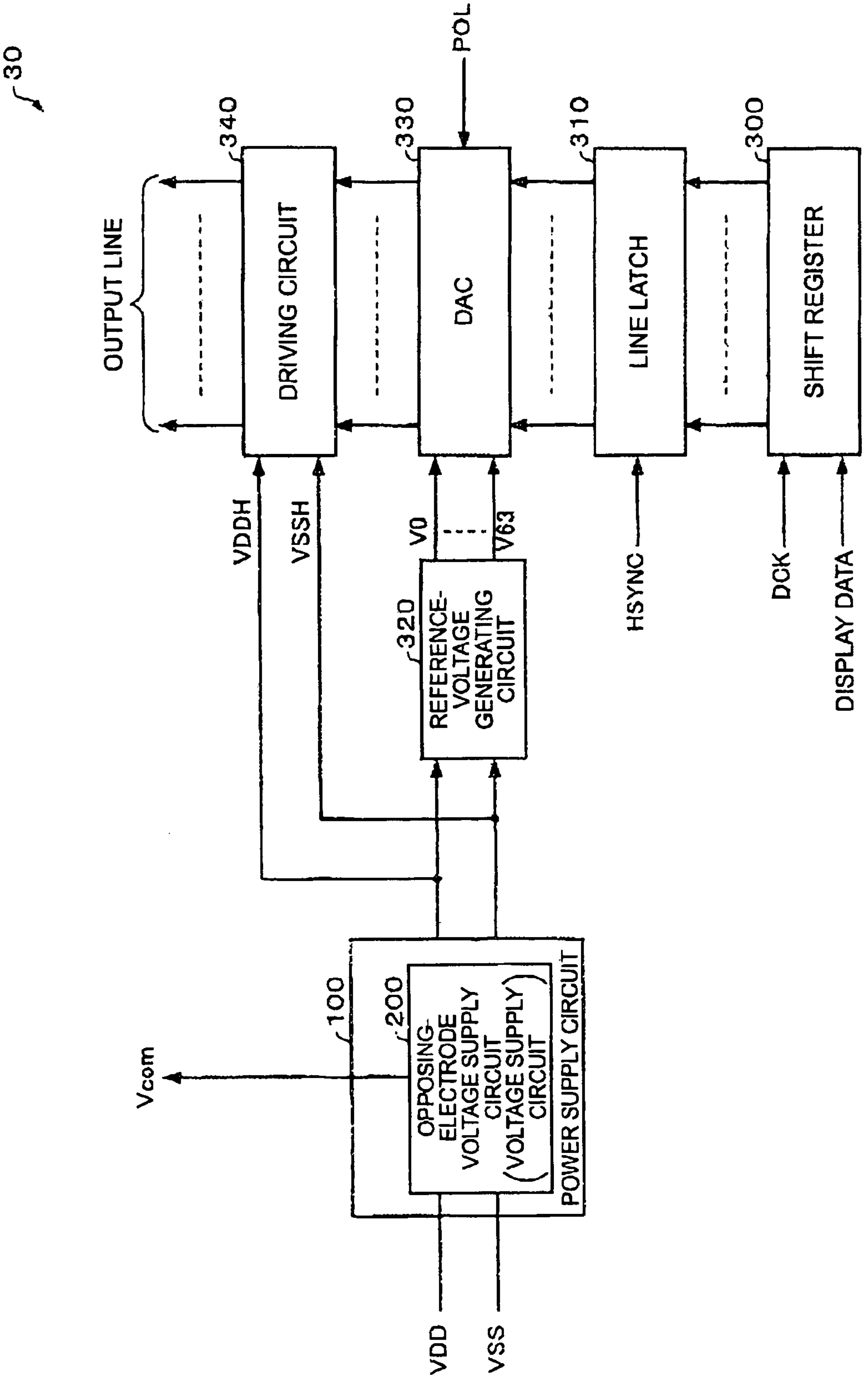
FIG. 17 is a block diagram showing an example configuration of a data driver including the power supply circuit according to the present embodiment.

FIG. 17 is a block diagram showing an example configuration of a data driver including the power supply circuit according to the present embodiment. This data driver is applicable to the liquid crystal display shown in FIG. 1.

The data driver 30 includes a shift register 300, a line latch 310, a reference-voltage generating circuit 320, a digital/analog converter (DAC, a voltage selection circuit in a broad sense) 330, a driving circuit 340, and the power supply circuit 100.

The shift register 300 shifts, in sync with the dot clock DCK, display data input serially on a pixel-by-pixel (or dot-by-dot) basis, and thereby loading display data of one horizontal scanning, for example. The dot clock DCK is supplied by the display controller 38. If a pixel is composed of R, G, and B signals (six bits each), the pixel (three dots) has 18 bits.

The line latch 310 latches the display data loaded by the shift register 300 upon a change in a horizontal synchronous signal HSYNC.

The reference-voltage generating circuit 320 generates a plurality of reference voltages corresponding to display data. Specifically, the reference-voltage generating circuit 320 generates a plurality of reference voltages V0 to V63 corresponding to display data each having six bits based on a higher-potential power supply voltage VDDH and a lower-potential power supply voltage VSSH.

The DAC 330 generates a display voltage for each output line corresponding to the display data output from the line latch 310. Specifically, the DAC 330 selects a reference voltage corresponding to the display data of one output line output by the line latch 310 among the plurality of reference voltages V0 to V63 generated by the reference-voltage generating circuit 320, and outputs the selected reference voltage as a driving voltage.

The driving circuit 340 drives a plurality of output lines each of which is coupled to a data line included in the liquid crystal display panel 20. Specifically, the driving circuit 340 drives each output line based on the driving voltage generated for each output line by the DAC 330. The driving circuit 340 includes a plurality of data-line driving circuits DRV-1 to DRV-N each of which corresponds to an output line. Each of the data-line driving circuits DRV-1 to DRV-N includes a voltage-follower operational amplifier.

The power supply circuit 100 includes an opposing-electrode voltage supply circuit 200. Accordingly, the power supply circuit 100 includes a voltage supply circuit according to the embodiment or its modification. The power supply circuit 100 also generates the higher-potential power supply voltage VDDH and the lower-potential power supply voltage VSSH based on the voltage between the system power supply voltage VDD and the system ground power supply voltage VSS. The higher-potential power supply voltage VDDH and the lower-potential power supply voltage VSSH are supplied to the reference-voltage generating circuit 320 and the driving circuit 340.

In the data driver 30 having this configuration, the line latch 310 latches display data of one horizontal scanning, for example, loaded by the shift register 300. By using the display data latched by the line latch 310, a driving voltage is generated for each output line. Then the driving circuit 340 drives each output line based on the driving voltage generated by the DAC 330.

Figure 18:
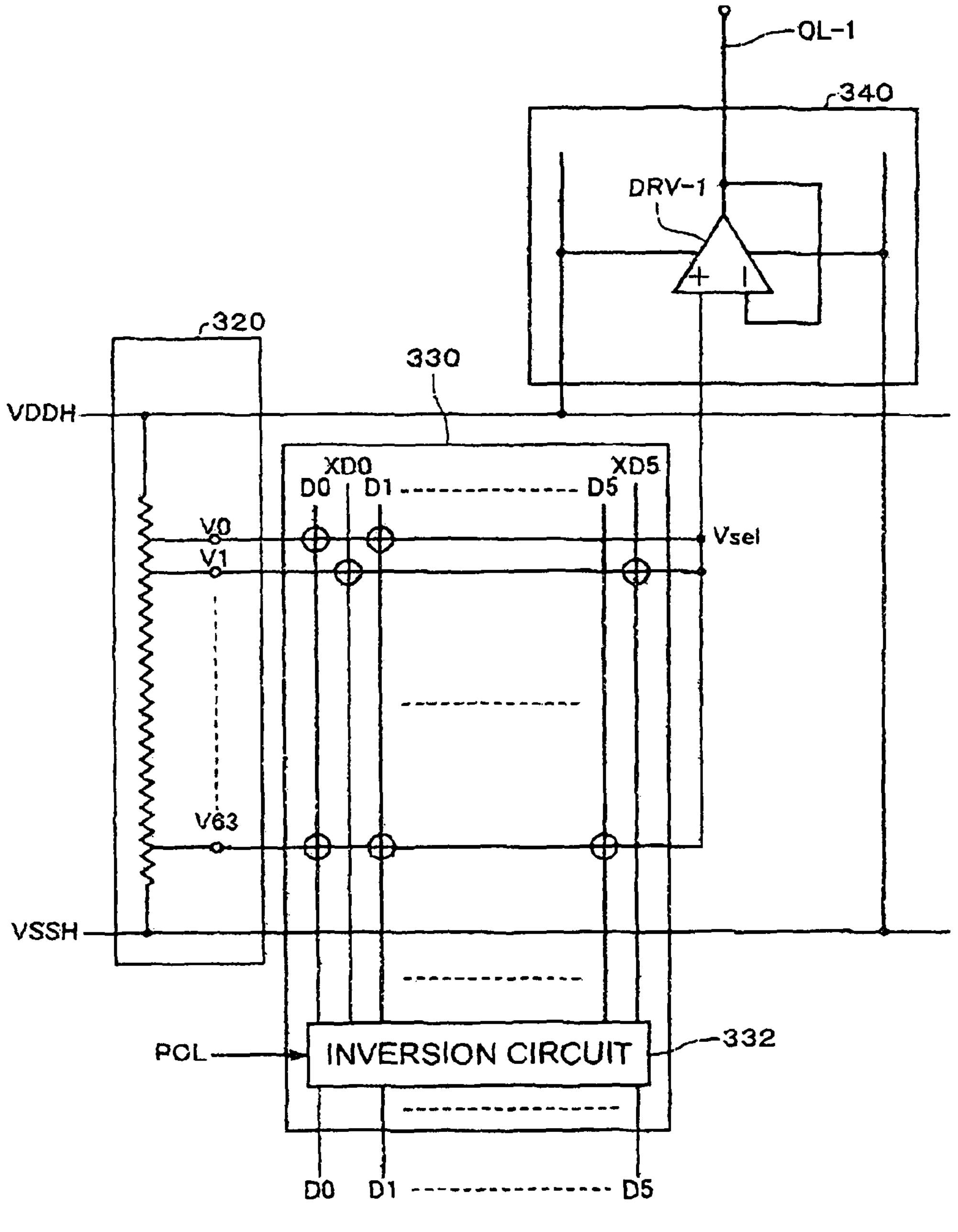
FIG. 18 schematically shows a configuration including the reference-voltage generating circuit, the DAC, and the driving circuit shown in FIG. 17.

FIG. 18 schematically shows a configuration including the reference-voltage generating circuit 320, the DAC 330, and the driving circuit 340. While this diagram shows the data-line driving circuit DRV-1 only in the driving circuit 340, the same can be said for the other driving circuits.

In the reference-voltage generating circuit 320, a resistive circuit is coupled between the higher-potential power supply voltage VDDH and the lower-potential power supply voltage VSSH. The reference-voltage generating circuit 320 generates a plurality of divided voltages obtained by dividing the voltage between the higher-potential power supply voltage VDDH and the lower-potential power supply voltage VSSH with the resistive circuit as the reference voltages V0 to V63. Since one voltage with a positive polarity and another voltage with a negative polarity are not symmetrical in polarity inversion driving, one reference voltage for the positive polarity and another reference voltage for the negative polarity are generated. FIG. 18 shows one of the two.

The DAC 330 can be an ROM decoder circuit. The DAC 330 selects and outputs one of the reference voltages V0 to V63 based on six-bit display data as a selected voltage Vsel to the data-line driving circuit DRV-1. In the same manner, a voltage selected based on corresponding six-bit display data is output as for the other data-line driving circuits DRV-2 to DRV-N.

The DAC 330 includes an inverting circuit 332. The inverting circuit 332 inverts display data based on the polarity inversion signal POL. To the DAC 330, six-bit display data D0 to D5 and six-bit inverted display data XD0 to XD5 are input. The inverted display data XD0 to XD5 are obtained by bit-inverting the display data D0 to D5, respectively. The DAC 330 selects one of the reference voltages V0 to V63, which is multi-valued, generated by the reference-voltage generating circuit 320 based on display data.

For example, when the polarity inversion signal POL is at the H level, the reference voltage V2 is selected in response to the six-bit display data D0 to D5 "000010" (=2). Meanwhile, when the polarity inversion signal POL is at the L level, the reference voltage V61 is selected in response to the inverted display data XD0 to XD5 "111101" (=61) obtained by inverting the display data D0 to D5.

The selected voltage Vsel selected by the DAC 330 is then supplied to the data-line driving circuit DRV-1.

The data-line driving circuit DRV-1 drives an output line OL-1 based on the selected voltage Vsel. Also, the power supply circuit 100 changes the voltage of the opposing electrode in sync with the polarity inversion signal POL as described above. Accordingly, the polarity of the voltage applied to the liquid crystal is inverted for driving.

By incorporating the power supply circuit 100 in the data driver 30, it is possible to reduce a mounting area included in the liquid crystal display 10 and to provide a display driver that consumes less power and prevents picture quality from degrading.

While the data driver 30 incorporates the power supply circuit in FIGS. 17 and 18, the gate driver 32 may incorporate the power supply circuit.

4. Electronic Apparatus

Figure 19:
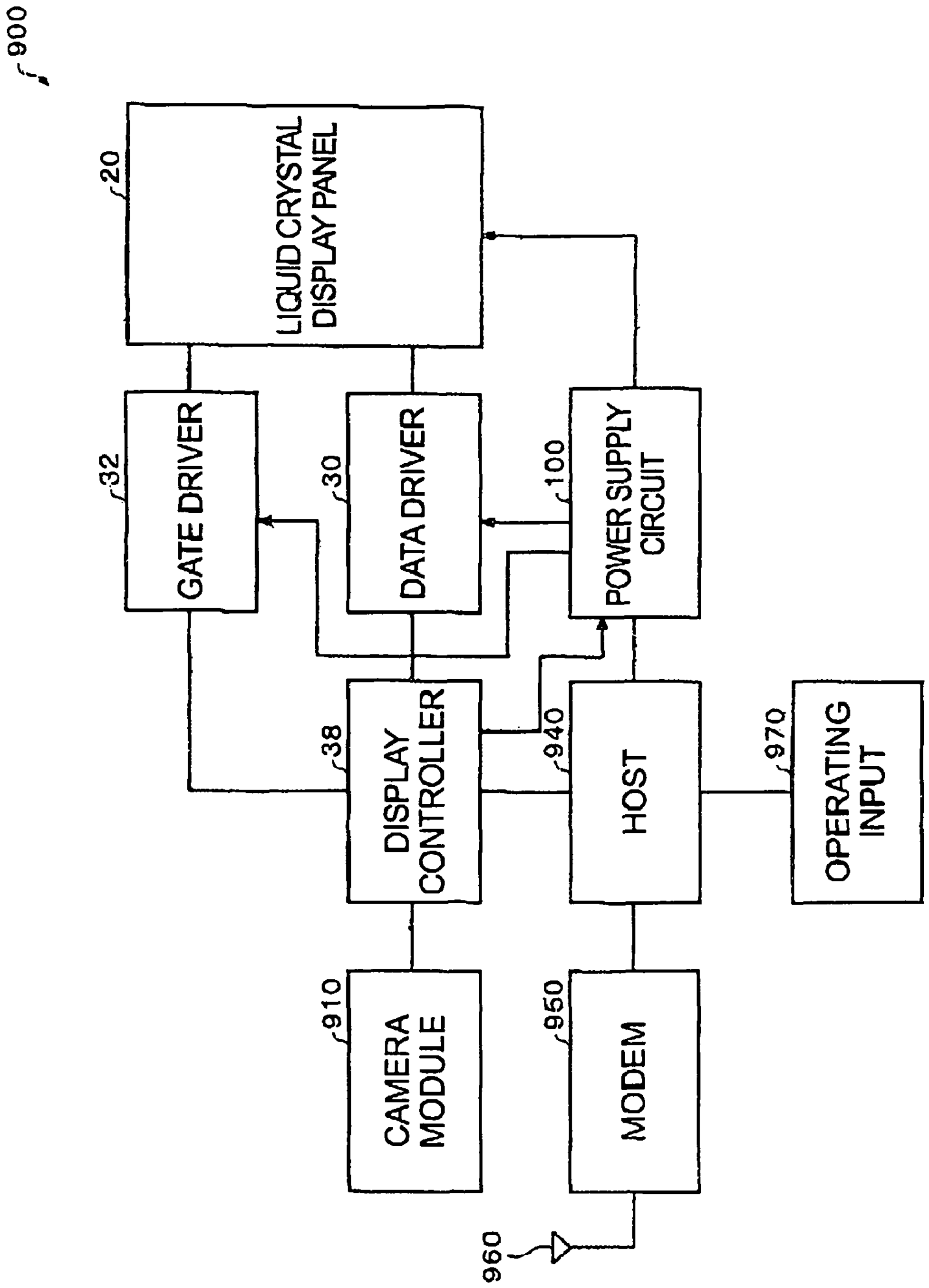
FIG. 19 is a block diagram showing an example configuration of an electronic apparatus according to one embodiment of the invention.

FIG. 19 is a block diagram showing an example configuration of an electronic apparatus according to one embodiment of the invention. This diagram shows an example configuration of a cellular phone as this electronic apparatus. The parts same as shown in FIG. 1 or 2 are given the same numerals in FIG. 19 and explanation thereof will be omitted here.

This cellular phone 900 includes a camera module 910. The camera module 910 includes a CCD camera to supply data of images captured by the CCD camera to the display controller 38 in YUV format.

The cellular phone 900 also includes the liquid crystal display panel 20. The liquid crystal panel 20 is driven by the data driver 30 and the gate driver 32. The liquid crystal display panel 20 includes a plurality of gate lines, a plurality of source lines, and a plurality of pixels.

The display controller 38 is coupled to the data driver 30 and the gate driver 32, and supplies display data in RGB format to the data driver 30.

The power supply circuit 100 is coupled to the data driver 30 and the gate driver 32, and supplies a driving power supply voltage to each of the drivers. The circuit also supplies an opposing-electrode voltage Vcom to the opposing electrode included in the liquid crystal display panel 20.

A host 940 is coupled to the display controller 38. The host 940 controls the display controller 38. The host 940 also demodulates display data received via an antenna 960 with a modem 950, and then supplies the data to the display controller 38. The display controller 38 has images displayed on the liquid crystal display panel 20 based on the display data with the data driver 30 and the gate driver 32.

After modulating the display data generated by the camera module 910 with the modem 950, and the host 940 can direct the transmission of the data to other communication apparatuses via the antenna 960.

Based on operational information from an operating input 970, the host 940 performs processing of display data transmission and reception, imaging with the camera module 910, and displaying with the liquid crystal display panel 20.

It should be noted that the invention is not limited to the above-mentioned embodiments, and various changes can be made within the scope of the invention. For example, the invention is applicable not only to driving the opposing electrode included in the above-described liquid crystal display panel, but also to driving electroluminescent and plasma displays. It should also be understood that the invention is applicable not only to an opposing electrode included in a liquid crystal display panel, but also to a power supply circuit that applies a voltage to an electrode.

Part of requirements of any claim of the invention could be omitted from a dependent claim which depends on that claim. Moreover, part of requirements of any independent claim of the invention could be made to depend on any other independent claim.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. A voltage supply circuit that switches a first voltage supplied to an electrode to a second voltage, and supplies the second voltage to the electrode, the voltage supply circuit comprising:

a first voltage boost circuit including a switching element that generates a third voltage and a fourth voltage that are boosted by a charge-pump operation based on a power supply voltage of the first voltage boost circuit, the fourth voltage being higher than the third voltage;

a first selection circuit that selects either the second voltage or the third voltage, the second voltage being obtained based on the fourth voltage; and a charge supply circuit that supplies a charge to the first selection circuit, the first selection circuit supplying the third voltage to the electrode during a first period, the first selection circuit supplying the second voltage to the electrode during a second period, the charge supply circuit supplying the charge to the first selection circuit so as to maintain the voltage of the electrode at the second voltage after the third voltage has been supplied to the electrode, the first voltage being lower than the second voltage, the third voltage just before an ending time of the first period being lower than the second voltage just after a starting time of the second period, the charge supply circuit including an operational amplifier to which a higher-potential power supply voltage of the charge supply circuit and a lower-potential power supply voltage of the charge supply circuit are supplied, the operational amplifier including a first input terminal to which a reference voltage is supplied, and a second input terminal to which a voltage obtained by dividing a voltage between an output voltage of the operational amplifier and the lower-potential power supply voltage of the operational amplifier, and the fourth voltage being the higher-potential power supply voltage of the charge supply circuit.

2. The voltage supply circuit according to claim 1, the electrode being an opposing electrode placed face to face with a pixel electrode of an electro-optic device with an electro-optic material interposed, the first voltage being a lower-potential voltage to be supplied to the opposing electrode, the second voltage being a higher-potential voltage to be supplied to the opposing electrode, and the first voltage being switched to the second voltage in synchronization with polarity inversion timing of a voltage applied between the pixel electrode and the opposing electrode, and supplied to the opposing electrode.

3. The voltage supply circuit according to claim 2, the first voltage boost circuit supplying the third voltage to the first selection circuit and the charge supply circuit stopping supplying the charge in the first period started based on a change point of the polarity inversion timing, and the charge supply circuit starting to supply the charge to the first election circuit in the second period following the first period.

4. The voltage supply circuit according to claim 3, further comprising:

a period setting register that sets the first period, a period corresponding to a set value of the period setting register being set as the first period.

5. A power supply circuit that supplies a voltage to an opposing electrode placed face to face with a pixel electrode of an electro-optic device with an electro-optic material interposed, the power supply circuit comprising:

a higher-potential-opposing-electrode voltage generating circuit that includes the voltage supply circuit according to claim 2 and generates the higher-potential voltage to be supplied to the opposing electrode;

a lower-potential-opposing-electrode voltage generating circuit that generates the lower-potential voltage to be supplied to the opposing electrode; and a second selection circuit that selects and outputs one of the higher-potential voltage and the lower-potential voltage to the opposing electrode in synchronization with polarity inversion timing, the power supply circuit supplying the charge to the opposing electrode so as to maintain the voltage of the opposing electrode at the higher-potential voltage, after the third voltage has been supplied to the opposing electrode, in synchronization with the polarity inversion timing.

6. A display driver that drives an electro-optic device including a pixel electrode defined by a scanning line and a data line of the electro-optic device, and an opposing electrode placed face to face with the pixel electrode with an electro-optic material interposed, the display driver comprising:

the voltage supply circuit according to claim 2 for supplying a voltage to the opposing electrode; and a driving circuit that drives the electro-optic device.

7. A voltage supply method comprising:

setting an electrode to a first voltage having a first voltage level;

setting the electrode to a second voltage that has a second voltage level higher than the first voltage level; and generating a third voltage by a charge-pump operation based on a power supply voltage to set the electrode to the third voltage during at least a period from a first time at which the setting of the electrode to the first voltage is completed to a second time at which the setting of the electrode to the second voltage commences, the second voltage being obtained based on a fourth voltage, the fourth voltage being generated by the charge-pump operation based on the power supply voltage, a fourth voltage level of the fourth voltage being higher than a third voltage level of the third voltage, and the third voltage level of the third voltage just before the second time being lower than the second voltage level of the second voltage just after the second time.

8. A voltage supply circuit comprising:

a first selection circuit that alternatively outputs a plurality of voltages including a first voltage, a second voltage and a third voltage to an electrode; and a charge pump circuit that generates the third voltage based on a power supply voltage of the charge pump circuit to set the the third voltage during at least a part of a period from a first time at which the first voltage is outputted to the electrode to a second time at which the second voltage is outputted to the electrode, the charge pump circuit generating a fourth voltage based on the power supply voltage of the charge pump circuit, the second voltage being obtained based on the fourth voltage, the fourth voltage being higher than the third voltage, the first voltage being lower than the second voltage, and the third voltage just before the second time being lower than the second voltage just after the second time.

9. The voltage supply circuit according to claim 8, the first voltage having a first voltage level, the second voltage having a second voltage level, the third voltage having a third voltage level, the first voltage level being different from the second voltage level, and the third voltage level being different from the first voltage level and the second voltage level.

10. A voltage supply circuit comprising:

a first selection circuit that alternatively outputs a plurality of voltages including a first voltage having a first voltage level, a second voltage having a second voltage level higher than the first voltage level, and third voltage having a third voltage level to an electrode;

a charge pump circuit that generates the third voltage having the third voltage level based on a power supply voltage of the charge pump circuit during at least a part of a period from a first time at which the first voltage is outputted to the electrode to a second time at which the second voltage is outputted to the electrode; and a second selection circuit that selects either one of the second voltage and the third voltage for the first selection circuit, the charge pump circuit generating a fourth voltage having a fourth voltage level based on the power supply voltage of the charge pump circuit, the second voltage being obtained based on the fourth voltage, the fourth voltage level being higher than the third voltage level, the third voltage level of the third voltage just before the second time being lower than the second voltage level of the second voltage just after the second time.

11. The voltage supply circuit according to claim 10, further comprising:

a voltage regulation circuit that outputs the second voltage to the second selection circuit.

12. The voltage supply circuit according to claim 10, the charge pump circuit including a capacitor and a switching element.

13. The voltage supply circuit according to claim 11, the voltage regulation circuit including an operational amplifier.

14. A voltage supply circuit comprising:

a first selection circuit that outputs a first voltage to an electrode during a first period, the first selection circuit outputting a second voltage to the electrode during a second period;

a voltage regulation circuit that includes an operational amplifier and that generates the second voltage based on a fourth voltage;

a charge pump circuit that includes a capacitor and a switching element, the charge pump circuit performing a charge pump operation and generating a third voltage based on a power supply voltage of the charge pump circuit during at least a part of a third period between the first period and the second period, the charge pump circuit generating the fourth voltage based on the power supply voltage of the charge pump circuit, and the fourth voltage being higher than the third voltage; and a second selection circuit that is electrically connected to the voltage regulation circuit at least a part of the second period, the second selection circuit being electrically connected to the charge pump circuit at least a part of the third period to output the third voltage to the electrode, the first voltage being lower than the second voltage, and the third voltage just before an ending time of the third period being lower than the second voltage just after a starting time of the second period.

15. A display driver comprising:

the voltage supply circuit according to claim 14.

16. An electronic apparatus, comprising:

the voltage supply circuit according to claim 14.

* * * * *